United States Patent
Chung

(10) Patent No.: US 11,294,490 B2
(45) Date of Patent: Apr. 5, 2022

(54) TOUCH DISPLAY DEVICE, TOUCH DRIVING CIRCUIT, TOUCH CONTROLLER, AND TOUCH SENSING METHOD

(71) Applicant: LG DISPLAY CO., LTD., Seoul (KR)

(72) Inventor: JuneGun Chung, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/116,358

(22) Filed: Dec. 9, 2020

(65) Prior Publication Data
US 2021/0200356 A1 Jul. 1, 2021

(30) Foreign Application Priority Data

Dec. 26, 2019 (KR) .................. 10-2019-0175004

(51) Int. Cl.
*G06F 3/041* (2006.01)
(52) U.S. Cl.
CPC ........ *G06F 3/0412* (2013.01); *G06F 3/04162* (2019.05)

(58) Field of Classification Search
CPC ... G06F 3/0412; G06F 3/0445; G06F 3/04162
See application file for complete search history.

(56) References Cited

U.S. PATENT DOCUMENTS

2018/0107338 A1\* 4/2018 Chung ................ G06F 3/04182

\* cited by examiner

*Primary Examiner* — Lisa S Landis
(74) *Attorney, Agent, or Firm* — Birch, Stewart, Kolasch & Birch, LLP

(57) ABSTRACT

A communication interface that can decrease a transmission time between a touch driving circuit and a touch controller at the time of performing a pen touch sensing operation is provided. The touch display device can include a touch panel in which touch electrodes are arranged; a touch controller that outputs a first master signal to a first master pin corresponding to one end of a first interface, outputs a second master signal to a second master pin corresponding to one end of a second interface, receives first slave data from the first master pin, and receives second slave data from the second master pin; and a touch driving circuit that receives the first and second master signals, and outputs the first slave data to a first slave pin and outputs the second slave data to a second slave pin in response to the first master signal and the second master signal.

20 Claims, 16 Drawing Sheets

TOUCH DISPLAY DEVICE, TOUCH DRIVING CIRCUIT, TOUCH CONTROLLER, AND TOUCH SENSING METHOD

CROSS REFERENCE TO RELATED APPLICATION

This application claims priority to Korean Patent Application No. 10-2019-0175004, filed in the Republic of Korea on Dec. 26, 2019, the entire contents of which are hereby expressly incorporated by reference for all purposes as if fully set forth herein into the present application.

BACKGROUND

Field of the Invention

Embodiments of the present disclosure relate to a touch display device, a touch driving circuit, a touch controller, and a touch sensing method.

Discussion of the Related Art

With advancement in information-oriented society, requirements for various types of display devices that display an image have increased. Among such display devices, there is a touch display device that provides a touch-based input system enabling a user to easily, intuitively, and conveniently input information or commands instead of normal input systems using buttons, a keyboard, a mouse, and the like.

In order to provide a touch-based input system, a touch display device has to ascertain a touch of a user's finger, pen, or the like and accurately sense touch coordinates (a touch position).

A touch display device has to accurately and fast ascertain a touch or a touch position such that a satisfactory touch input without discomfort can be provided to a user. However, in reality, considerably much time is required for signal transmission and signal processing between elements for sensing a touch in the touch display device and a satisfactory touch input cannot be provided to a user.

SUMMARY

Embodiments of the present disclosure provide a touch display device that includes an efficient communication interface between a touch driving circuit and a touch controller which are elements for sensing a touch, and a touch driving circuit, a touch controller, and a touch sensing method that can independently perform display and touch sensing.

Embodiments of the present disclosure provide a fast transmission protocol using an efficient communication interface between a touch driving circuit and a touch controller and also provide a touch display device, a touch driving circuit, a touch controller, and a touch sensing method that can provide fast transmission of signals.

Embodiments of the present disclosure provide a touch display device, a touch driving circuit, a touch controller, and a touch sensing method in which the touch controller can fast transmit pen position information to the touch driving circuit and the touch driving circuit can fast perform local sensing and fast track a pen position.

According to an aspect of the present disclosure, there is provided a touch display device including a touch panel in which a plurality of touch electrodes are arranged; a touch controller that outputs one or more pieces of first pen position information to a first master pin corresponding to one end of a first interface, outputs one or more pieces of second pen position information other than the first pen position information to a second master pin corresponding to one end of a second interface, receives first sensing data from the first master pin, and receives second sensing data from the second master pin; and a touch driving circuit that receives the one or more pieces of first pen position information from a first slave pin corresponding to the other end of the first interface, receives the one or more pieces of second pen position information from a second slave pin corresponding to the other end of the second interface, senses a pen signal from the touch electrodes which are arranged in one or more local areas in the touch panel indicated by the one or more pieces of first pen position information and the one or more pieces of second pen position information, outputs the first sensing data out of sensing data which is generated as a result of sensing to the first slave pin, and outputs the second sensing data out of the sensing data to the second slave pin.

The touch controller can output a first command signal including the one or more pieces of first pen position information along with command information to the first master pin and output a second command signal including the one or more pieces of second pen position information to the second master pin while outputting the first command signal to the first master pin. The one or more pieces of first pen position information and the one or more pieces of second pen position information can be pen position information on the same pen or pen position information on different pens.

The touch driving circuit can receive the first command signal including the one or more pieces of first pen position information from the first slave pin and receive the second command signal including the one or more pieces of second pen position information from the second slave pin.

The touch controller can output a first address signal including address information to the first master pin, and the touch driving circuit can receive the first address signal including the address information from the first slave pin.

The touch controller can output a slave selection signal to a third master pin corresponding to one end of a third interface, and the touch driving circuit can receive the slave selection signal from a third slave pin corresponding to the other end of the third interface.

The slave selection signal can have a first signal level and a second signal level which are different from each other and a period in which the slave selection signal has the second signal level can include a first period, a second period, and a third period.

The first address signal can be transmitted from the touch controller to the touch driving circuit via the first interface in the first period.

In the second period, the one or more pieces of first pen position information included in the first command signal can be transmitted from the touch controller to the touch driving circuit via the first interface and the one or more pieces of second pen position information can be transmitted from the touch controller to the touch driving circuit via the second interface.

In the third period, the first sensing data can be transmitted from the touch driving circuit to the touch controller via the first interface and the second sensing data other than the first sensing data can be transmitted from the touch driving circuit to the touch controller via the second interface.

The touch controller can output a first clock signal, a second clock signal, and a third clock signal to a fourth master pin corresponding to one end of a fourth interface.

The touch driving circuit can receive the first clock signal, the second clock signal, and the third clock signal from a fourth slave pin corresponding to the other end of the fourth interface.

A period in which the first clock signal is transmitted from the touch controller to the touch driving circuit via the fourth interface can include the first period.

A period in which the second clock signal is transmitted from the touch controller to the touch driving circuit via the fourth interface can include the second period.

A period in which the third clock signal is transmitted from the touch controller to the touch driving circuit via the fourth interface can include the third period.

The touch controller can output a second address signal including control information to the second master pin while outputting the first address signal to the first master pin. The touch driving circuit can receive the second address signal including the control information from the second slave pin while receiving the first address signal from the first slave pin. Here, the control information can include one or more of address information other than the address information, driving control information, and pen number information.

The touch driving circuit can sense a first symbol section of a pen signal which is supplied to one or more touch electrodes in the touch panel in a first sensing time, convert an analog sensing value based on a result of sensing in the first sensing time into a digital sensing value to generate sensing data in a first conversion time, divide the sensing data generated in the first conversion time into the first sensing data and the second sensing data, and transmit the divided first and second sensing data to the touch controller via the first interface and the second interface, respectively, in a first transmission time.

The first conversion time can be equal to or shorter than the first sensing time and the first transmission time can be equal to or shorter than the first conversion time.

The touch driving circuit can sense a second symbol section of a pen signal which is supplied to one or more touch electrodes in the touch panel in a second sensing time, convert an analog sensing value based on a result of sensing in the second sensing time into a digital sensing value to generate the sensing data in a second conversion time, divide the sensing data generated in the second conversion time into the first sensing data and the second sensing data, and transmit the divided first and second sensing data to the touch controller via the first interface and the second interface, respectively, in a second transmission time.

The second sensing time can overlap the first conversion time and the second conversion time can overlap the first transmission time.

The first conversion time can be equal to or shorter than the second sensing time and the first transmission time can be equal to or shorter than the second conversion time.

According to another aspect of the present disclosure, there is provided a touch display device including a touch panel in which a plurality of touch electrodes are arranged; a touch controller that outputs a first master signal to a first master pin corresponding to one end of a first interface, outputs one or more second master signals other than the first master signal to a second master pin corresponding to one end of a second interface, receives first slave data from the first master pin, and receives second slave data from the second master pin; and a touch driving circuit that receives the first master signal from a first slave pin corresponding to the other end of the first interface, receives the second master signal from a second slave pin corresponding to the other end of the second interface, and outputs the first slave data to the first slave pin and outputs the second slave data to the second slave pin in response to the first master signal and the second master signal.

According to another aspect of the present disclosure, there is provided a touch controller that performs a master-slave operation with a touch driving circuit. The touch controller includes a first master pin that corresponds to a first interface; a second master pin that corresponds to a second interface; and a master input/output circuit that outputs first pen position information to the touch driving circuit via the first master pin, outputs second pen position information other than the first pen position information to the touch driving circuit via the second master pin, and receives first sensing data out of sensing data, which is generated as a result of sensing a pen signal using touch electrodes arranged in one or more local areas in a touch panel which are indicated by the first pen position information and the second pen position information by the touch driving circuit, from the touch driving circuit via the first master pin.

The master input/output circuit can receive second sensing data other than the first sensing data out of the sensing data from the touch driving circuit via the second master pin while receiving the first sensing data from the touch driving circuit via the first master pin.

According to another aspect of the present disclosure, there is provided a touch driving circuit, a touch controller performing a master-slave operation with the touch driving circuit. The touch driving circuit includes a first slave pin that corresponds to the other end out of one end and the other end of a first interface; a second slave pin that corresponds to the other end out of one end and the other end of a second interface; and a slave input/output circuit that receives first pen position information from the touch controller via the first slave pin, receives second pen position information other than the first pen position information from the touch controller via the second slave pin, senses a pen signal using touch electrodes which are arranged in one or more local areas in a touch panel indicated by the first pen position information and the second pen position information, and outputs first sensing data out of sensing data generated as a result of sensing to the touch controller via the first slave pin.

The slave input/output circuit can output second sensing data other than the first sensing data out of the sensing data to the touch controller via the second slave pin while outputting the first sensing data to the touch controller via the first slave pin.

According to another aspect of the present disclosure, there is provided a touch sensing method in a touch display device including a touch controller and a touch driving circuit that perform a master-slave operation, the touch sensing method including a step of causing the touch controller to transmit one or more pieces of first pen position information to the touch driving circuit via a first interface and to transmit one or more pieces of second pen position information other than the one or more pieces of first pen position information to the touch driving circuit via a second interface; a step of causing the touch driving circuit to sense a pen signal using touch electrodes which are arranged in one or more local areas in a touch panel indicated by the one or more pieces of first pen position information and the one or more pieces of second pen position information received via the first interface and the second interface; a step of causing the touch driving circuit to transmit sensing data to the touch controller via one or more of the first interface and the second interface as a result of sensing; and a step of causing the touch controller to sense one or more pen touches on the basis of the sensing data received via the one or more of the first interface and the second interface.

According to embodiments of the present disclosure, it is possible to provide a touch display device that includes an efficient communication interface between a touch driving circuit and a touch controller which are elements for sensing a touch, a touch driving circuit, a touch controller, and a touch sensing method.

According to embodiments of the present disclosure, it is possible to provide a fast transmission protocol using an efficient communication interface between a touch driving circuit and a touch controller and to provide a touch display device, a touch driving circuit, a touch controller, and a touch sensing method that can provide fast transmission of signals.

According to embodiments of the present disclosure, it is possible to a touch display device, a touch driving circuit, a touch controller, and a touch sensing method in which the touch controller can fast transmit pen position information to the touch driving circuit and the touch driving circuit can fast perform local sensing and fast track a pen position.

DETAILED DESCRIPTION OF THE EMBODIMENTS

Figure 1:
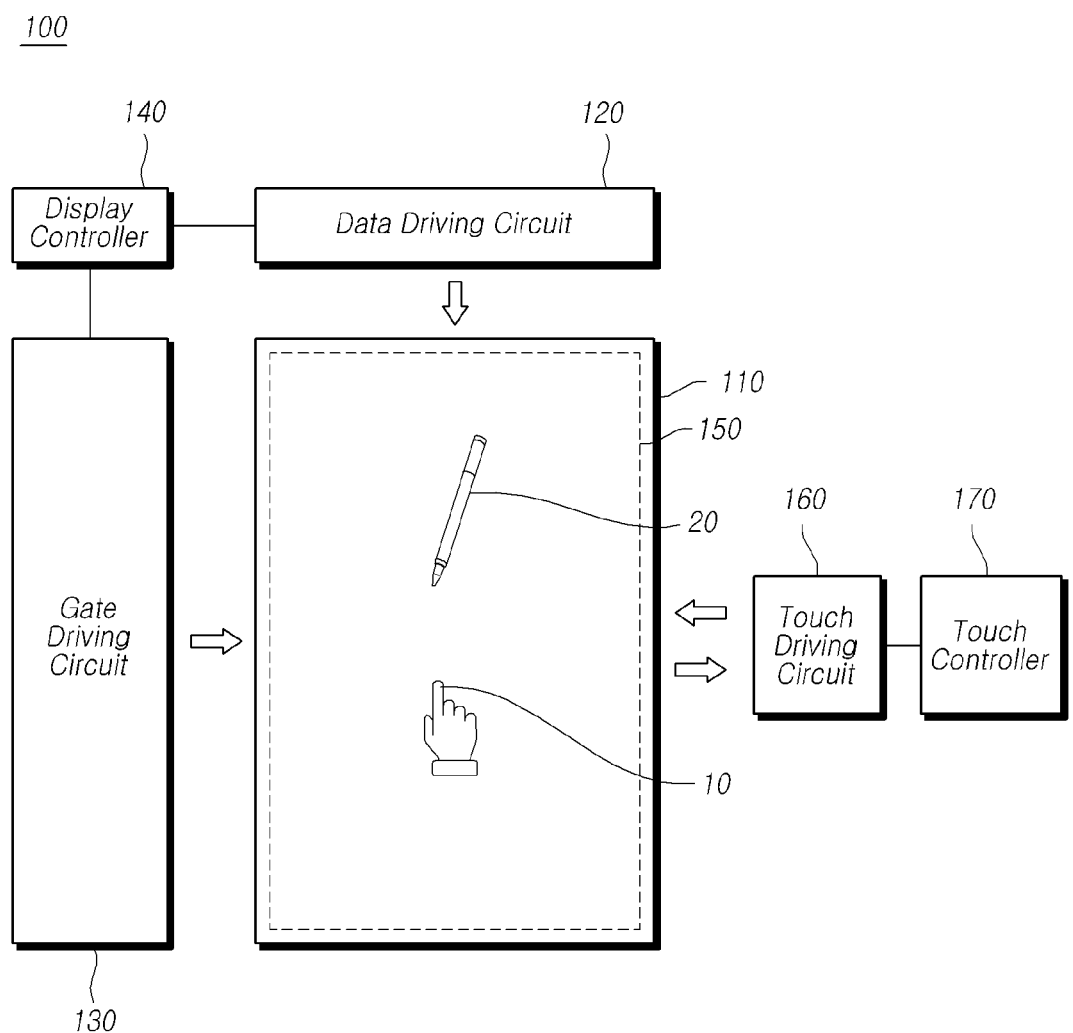
FIG. 1 is a diagram schematically illustrating a system configuration of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including," "having," "containing," "constituting," and "comprising" used herein are generally intended to allow other components to be added unless the terms are used with the term "only." As used herein, singular forms are intended to include plural forms unless the context clearly indicates otherwise.

Terms such as "first," "second," "A," "B," "(a)," and "(b)" can be used herein to describe elements of the present disclosure. Each of these terms is not used to define essence, order, sequence, or number of elements etc., but is used merely to distinguish the corresponding element from other elements.

When it is mentioned that a first element "is connected or coupled to," "overlaps," etc., a second element, it should be interpreted that, not only can the first element "be directly connected or coupled to" or "directly overlap" the second element, but a third element can also be "interposed" between the first and second elements, or the first and second elements can "be connected or coupled to," "overlap," etc. each other via a fourth element. Here, the second element can be included in at least one of two or more elements that "are connected or coupled to," "contact or overlap," etc. each other.

When time relative terms, such as "after," "subsequent to," "next," "before," and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term "may" fully encompasses all the meanings of the term "can."

Figure 2:
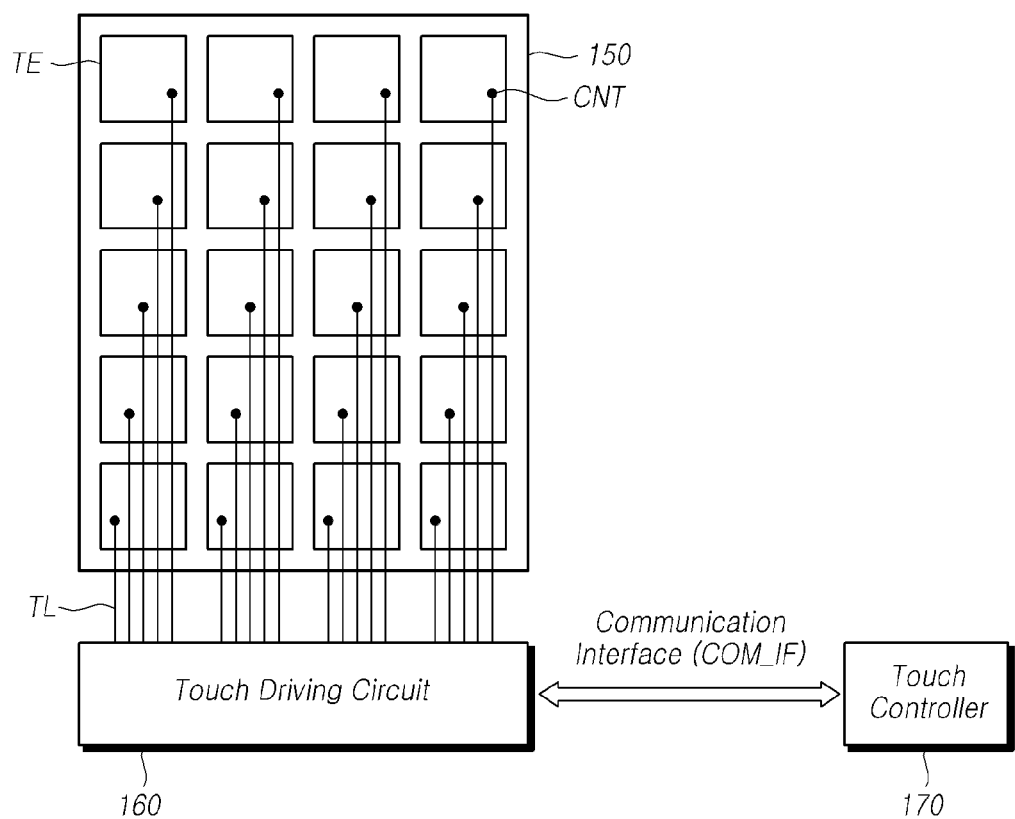
FIG. 2 is a diagram illustrating a touch system of a touch display device according to embodiments of the present disclosure.

FIG. 1 is a diagram schematically illustrating a system configuration of a touch display device 100 according to embodiments of the present disclosure. FIG. 2 is a diagram illustrating a touch system of the touch display device 100 according to embodiments of the present disclosure. All the components of the touch display device according to all embodiments of the present disclosure.

Referring to FIG. 1, the touch display device 100 according to the embodiments of the present disclosure provides both a function of displaying an image and a function of sensing a touch with a finger 10, a pen 20, or the like.

In order to provide the image display function, the touch display device 100 according to the embodiments of the present disclosure includes a display panel 110 in which a plurality of data lines and a plurality of gate lines are arranged and a plurality of subpixels defined by the plurality of data lines and the plurality of gate lines are arranged, a data driving circuit 120 that drives the plurality of data lines, a gate driving circuit 130 that drives the plurality of gate lines, and a display controller 140 that controls operations of the data driving circuit 120 and the gate driving circuit 130.

Each of the data driving circuit 120, the gate driving circuit 130, and the display controller 140 can be embodied by one or more individual components. In some cases, two or more of the data driving circuit 120, the gate driving circuit 130, and the display controller 140 can be integrated into a single component. For example, the data driving circuit 120 and the display controller 140 can be embodied as a single integrated circuit chip (IC chip).

In order to provide the touch sensing function, the touch display device 100 according to embodiments of the present disclosure includes a touch system for the touch sensing function. The touch system includes a touch panel 150 that includes a plurality of touch electrodes TE and a touch sensing circuit that supplies a touch driving signal to the touch panel 150, detects a touch sensing signal from the touch panel 150, and senses a touch or a touch position (touch coordinates) of a user's touch object with the touch panel 150 on the basis of the detected touch sensing signal.

Here, a touch object can be a finger 10, a pen 20, or the like. The pen 20 can be a passive pen not having a signal transmitting/receiving function or an active pen having a signal transmitting/receiving function. The pen 20 can also be referred to as a stylus or a stylus pen.

The touch sensing circuit includes a touch driving circuit 160 that supplies a touch driving signal to the touch panel 150 and detects a touch sensing signal from the touch panel 150 and a touch controller 170 that senses a touch and/or a touch position of a user with the touch panel 150 on the basis of the touch sensing signal detected by the touch driving circuit 160.

The touch driving circuit 160 includes a first circuit part that supplies a touch driving signal to the touch panel 150 and a second circuit part that detects a touch sensing signal from the touch panel 150. The first circuit part and the second circuit part can be integrated into a single part or can be separated from each other.

The touch controller 170 and the touch driving circuit 160 transmit and receive various signals required for touch sensing via a communication interface COM_IF. The communication interface COM_IF includes physical elements for transmitting and receiving signals between the touch controller 170 and the touch driving circuit 160 and can further include information on a signal format required for transmission and reception of a signal and a standard for a signal transmitting/receiving method (a transmission method) as a transmission protocol.

The touch driving circuit 160 and the touch controller 170 can be embodied as independent components or can be integrated and embodied as a single component in some cases.

On the other hand, the data driving circuit 120, the gate driving circuit 130, and the touch driving circuit 160 can be embodied as one or more integrated circuits, and can be embodied in a chip-on-glass (COG) type, a chip-on-film (COF) type, a tape carrier package (TCP) type, or the like in view of electrical connection to the display panel 110. The gate driving circuit 130 can be embodied in a gate-in-panel (GIP) type.

On the other hand, circuit elements such as the data driving circuit (DDC), gate driving circuit (GDC), and display controller (DCTR) for display driving and circuit elements 160 and 170 for touch driving and sensing can be embodied as one or more independent components. In some cases, one or more of circuit element 120, 130, and 140 for display driving and one or more of circuit elements 160 and 170 for touch driving and sensing can be functionally integrated and embodied as one or more components. For example, the data driving circuit 120 and the touch driving circuit 160 can be integrated and embodied as one or two or more integrated circuits. When the gate driving circuit 130 and the touch driving circuit 160 are integrated and embodied as two or more integrated circuit chips, each of the two or more integrated circuit chips has a data driving function and a touch driving function. For example, the touch driving circuit 160 can be embodied as a readout integrated circuit ROIC. Alternatively, the touch driving circuit 160 and the data driving circuit 120 can be embodied as one source-readout integrated circuit SRIC.

Referring to FIG. 2, the touch panel 150 includes a plurality of touch electrodes TE and a plurality of touch lines TL. Each of the plurality of touch electrodes TE is electrically connected to the corresponding touch line TL via one or more contact holes CNT.

The plurality of touch electrodes TE can be arranged in a state in which they are separated from each other and do not overlap each as illustrated in FIG. 2. In this case, the touch sensing circuit can sense a touch on the basis of a self-capacitance between the touch electrodes TE and the touch object. On the other hand, some of the plurality of touch electrodes TE can be arranged in a row direction and the other can be arranged in a column direction. In this case, the touch sensing circuit can sense a touch on the basis of a mutual-capacitance between the touch electrodes TE.

Each of the plurality of touch lines TL overlaps one or more touch electrodes TE. For example, the plurality of touch lines TL are arranged in parallel to the plurality of data lines or the plurality of gate lines.

Each of the plurality of touch electrodes TE overlaps two or more data lines or two or more gate lines. Each of the plurality of touch electrodes TE overlap two or more subpixels (a subpixel area).

The size of each of the plurality of touch electrodes TE can correspond to the size of an area of one subpixel for display or can correspond to the size of an area of two or more subpixels.

Each of the plurality of touch electrodes TE can be a plate type without any opening or can be a mesh type with one or more openings.

When one touch electrode TE is of a mesh type and has a size corresponding to the size of the area of two or more subpixels, one touch electrode TE includes two or more openings and the positions and sizes of the two or more openings correspond to the positions and sizes of emission areas of the subpixels.

On the other hand, the plurality of touch electrodes TE can be dedicated electrodes for touch sensing and can further have a function of a common electrode to which a common voltage is applied at the time of display driving. Particularly, when the touch panel 150 is incorporated in the display panel 110, the plurality of touch electrodes TE can perform the function of a touch sensor and the function of a common electrode.

The touch panel 150 can be provided outside the display panel 110. For example, the touch panel 150 and the display panel 110 can be separately manufactured and then coupled to each other. This touch panel 150 is referred to as an outer-mounted type or an add-on type.

On the other hand, the touch panel 150 can be incorporated into the display panel 110. For example, when the display panel 110 is manufactured, touch sensor structures such as a plurality of touch electrodes TE and a plurality of touch lines TL constituting the touch panel 150 can be formed along with electrodes and lines for display driving. This touch panel 150 is referred to as an inner-mounted type.

On the other hand, the touch display device 100 according to embodiments of the present disclosure can be a liquid crystal display (LCD), an organic light emitting diode (OLED) display, or a quantum dot display, but is not limited thereto and can be any type of display as long as touch sensor elements, touch sensor structures, and a touch sensing method which will be described below can be applied thereto.

For example, when the touch display device 100 according to embodiments of the present disclosure is a liquid crystal display device, the touch electrodes TE can be common electrodes which are provided in the display panel 110 and to which a common voltage for display driving is applied.

For example, when the touch display device 100 according to embodiments of the present disclosure is an OLED display, the touch display device can have a top emission structure in which light is emitted from the top of the display panel 110 or a bottom emission structure in which light is emitted from the bottom of the display panel 110

When the touch display device 100 according to embodiments of the present disclosure is an OLED display, the touch electrodes TE are provided in the display panel 110 and on an encapsulation layer which is located on transistors and organic light emitting diodes (OLED). The positions of these touch electrodes TE can be further suitable for the top emission structure.

When the touch display device 100 according to embodiments of the present disclosure is an OLED display, the touch electrodes TE can be anode electrodes of organic light emitting diodes (OLED) provided in the display panel 110 or can be electrodes in various layers located below the anode electrodes. The positions of these touch electrodes TE can be further suitable for the bottom emission structure.

The touch electrodes TE included in the touch display device 100 according to embodiments of the present disclosure can be of a mesh type with openings for emission efficiency and can be transparent electrodes or can further include transparent electrodes.

The touch electrodes TE included in the touch display device 100 according to embodiments of the present disclosure can be dedicated electrodes for touch sensing or can be electrodes which can be used for both display driving and touch sensing.

On the other hand, the touch display device 100 according to embodiments of the present disclosure can separately perform display driving for displaying an image and touch driving for sensing a touch in temporally divided periods.

On the other hand, the touch display device 100 according to embodiments of the present disclosure can simultaneously perform display driving for displaying an image and touch driving for sensing a touch.

The touch display device 100 can independently sense a touch while displaying an image, for example, updating an image for each frame.

Figure 3:
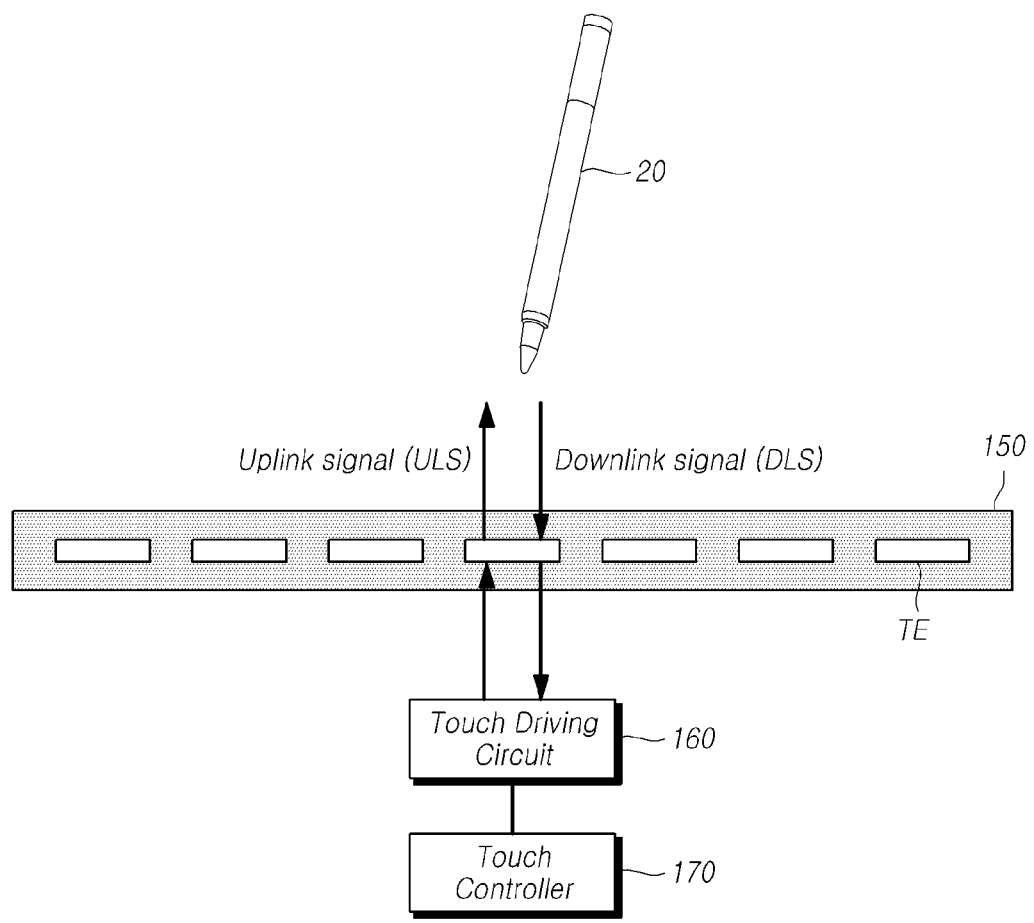
FIG. 3 is a diagram illustrating communication between the touch display device and a pen for sensing a pen touch according to embodiments of the present disclosure.

FIG. 3 is a diagram illustrating communication between the touch display device 100 and the pen 20 for sensing a pen touch according to embodiments of the present disclosure.

Referring to FIG. 3, a pen touch sensing system according to the embodiments of the present disclosure includes the touch display device 100 and one or more pens 20.

The pen touch sensing system according to the embodiments of the present disclosure provides bidirectional communication between the touch driving circuit 160 and the pen 20 for sensing the pen 20 which is in contact with or close to the touch panel 150.

The touch panel 150 can be a transmission medium for bidirectional communication between the touch driving circuit 160 and the pen 20. For example, the touch electrodes TE disposed in the touch panel 150 can serve as a transmission medium for bidirectional communication between the touch driving circuit 160 and the pen 20.

The bidirectional communication between the touch driving circuit 160 and the pen 20 includes uplink communication for transmitting a signal from the touch driving circuit 160 to the pen 20 via the touch panel 150 and downlink communication for transmitting a signal from the pen 20 to the touch driving circuit 160 via the touch panel 150.

A signal which is transmitted from the touch driving circuit 160 to the pen 20 via the touch panel 150 is also referred to as an uplink signal ULS. A signal which is transmitted from the pen 20 to the touch driving circuit 160 via the touch panel 150 is also referred to as a downlink signal DLS.

At the time of touch driving for pen sensing, the touch driving circuit 160 supplies an uplink signal ULS to all or some of the plurality of touch electrodes TE disposed in the touch panel 150.

Accordingly, the pen 20 which is in contact with or close to the touch panel 150 can receive an uplink signal ULS which is applied to one or more touch electrodes TE included in the touch panel 150 via its own pen tip.

The pen 20 outputs a downlink signal DLS (hereinafter also referred to as a pen signal) for allowing the touch driving circuit 160 to sense the position of the pen 20, the tilt (inclination) of the pen 20, or various types of accessory information of the pen 20 in response to the uplink signal ULS.

The downlink signal DLS output from the pen 20 is applied to one or more touch electrodes TE disposed in the touch panel 150.

The touch driving circuit 160 receives the downlink signal DLS which is output from the pen 20 and which is applied to one or more touch electrodes TE. The touch controller 170 recognizes presence of the pen 20 and the position, the tilt, and various types of accessory information of the pen 20 on the basis of the downlink signal DLS received by the touch driving circuit 160.

The touch driving circuit 160 includes a multiplexer circuit, a plurality of analog front ends, and an analog-to-digital converter ADC. Each analog front end AFE includes a pre-amplifier that is electrically connected to the touch electrodes TE and an integrator that integrates an output value of the pre-amplifier and outputs an integrated value.

In some cases, the touch display device 100 further includes a touch power circuit that takes charge of supply or generation of various voltages and signals required for touch sensing.

For example, the uplink signal USL includes a beacon signal. The beacon signal can be a signal for causing the touch display device 100 to control driving of the pen 20 for pen sensing or informing the pen 20 of various types of information required for pen sensing. Information included in a beacon signal is information for pen sensing. The information included in the beacon signal is also referred to as pen driving control information.

For example, pen driving control information included in a beacon signal can include one or more of panel information (for example, panel state information, panel identification information, and panel type information such as an in-cell type), panel driving mode information (for example, mode identification information such as a pen search mode and a pen mode), characteristic information of a downlink signal (for example, a frequency and the number of pulses), information relevant to a driving timing for pen sensing, multiplexer driving information, and power mode information (for example, driving timing information in which the panel and the pen are not driven for the purpose of a decrease in power consumption), and can further include information for driving synchronization between the touch panel 150 and the pen 20.

For example, a beacon signal is a signal having an information transmission function and thus can be a pulse-modulated signal in which pen driving control information is expressed by a plurality of pulses. In this case, pulse widths of the plurality of pulses included in a beacon signal may not be equal to each other.

On the other hand, an uplink signal can further include a ping signal. A pink signal is a control signal for synchronizing a downlink signal.

For example, the pen 20 can output a downlink signal at a time point at which the final pulse of the ping signal is recognized or after a predetermined time elapses therefrom. The ping signal includes one pulse or two or more pulses. When the ping signal includes two or more pulses, the ping signal is a signal having a synchronization signal but not having an information transmission function, and thus can be a pulse-modulated signal in which the pulse widths of pulses are the same. For example, the ping signal can be a signal that regularly swings between a high level and a low level without change in phase. The synchronization function of the ping signal can be provided by a beacon signal.

Referring to FIG. 3, the pen 20 outputs a pen signal corresponding to a downlink signal DLS in response to an uplink signal ULS such as a beacon signal after receiving the uplink signal ULS.

The pen signal corresponding to the downlink signal DLS includes a pen position sensing signal for allowing the touch driving circuit 160 to sense the position and/or the tilt (inclination) of the pen 20 and a pen data signal for allowing the touch driving circuit 160 to sense a pressure (a pen pressure) or various types of pen accessory information of the pen 20.

For example, pen accessory information includes one or more of a pen pressure, a pen ID, button information, battery information, and information error check and correction information.

The pen position sensing signal is a signal including periodical pulses with a voltage level varying at a constant frequency, and the pen data signal is a signal including non-periodical pulses with a voltage level varying without a constant frequency. For example, in the pulses constituting the pen position sensing signal, the lengths of high-level voltage sections are the same and the lengths of low-level voltage sections are the same. However, in the pulses constituting the pen data signal, some of the high-level voltage sections can have different lengths and some of the low-level voltage sections can have different lengths.

In a period in which the pen 20 outputs a pen signal such as a pen position sensing signal and a pen data signal, for example, in a period in which a pen touch is sensed, the touch driving circuit 160 can supply a signal with a constant voltage level (a DC voltage) to the touch electrodes TE. Unlike this, in a period in which a touch of only a finger 10 is sensed, the touch driving circuit 160 supplies a touch driving signal with a voltage level varying to the touch electrodes TE.

The touch driving circuit 160 sense a pen position sensing signal which is a pen signal output from the pen 20 and provides sensing data to the touch controller 170. The touch controller 170 finds out the pen position of the pen 20 on the basis of the received sensing data.

The touch controller 170 provides the pen position information on the found pen position to the touch driving circuit 160. The touch driving circuit 160 can sense only a predetermined area (hereinafter also referred to as a local area) corresponding to a spot in which the pen 20 is located using the provided pen position information.

A system for sensing all the touch electrodes TE disposed in the entire area of the touch panel 150 is referred to as a full-sensing system, and a system for sensing only the touch electrodes disposed in a partial area (a local area) of the touch panel 150 is referred to as a local-sensing system.

A communication interface COM_IF between the touch controller 170 and the touch driving circuit 160 and a transmission protocol for a signal transmitting/receiving method between the touch controller 170 and the touch driving circuit 160 using the communication interface COM_IF and a transmitted/received signal format will be described below.

Figure 4:
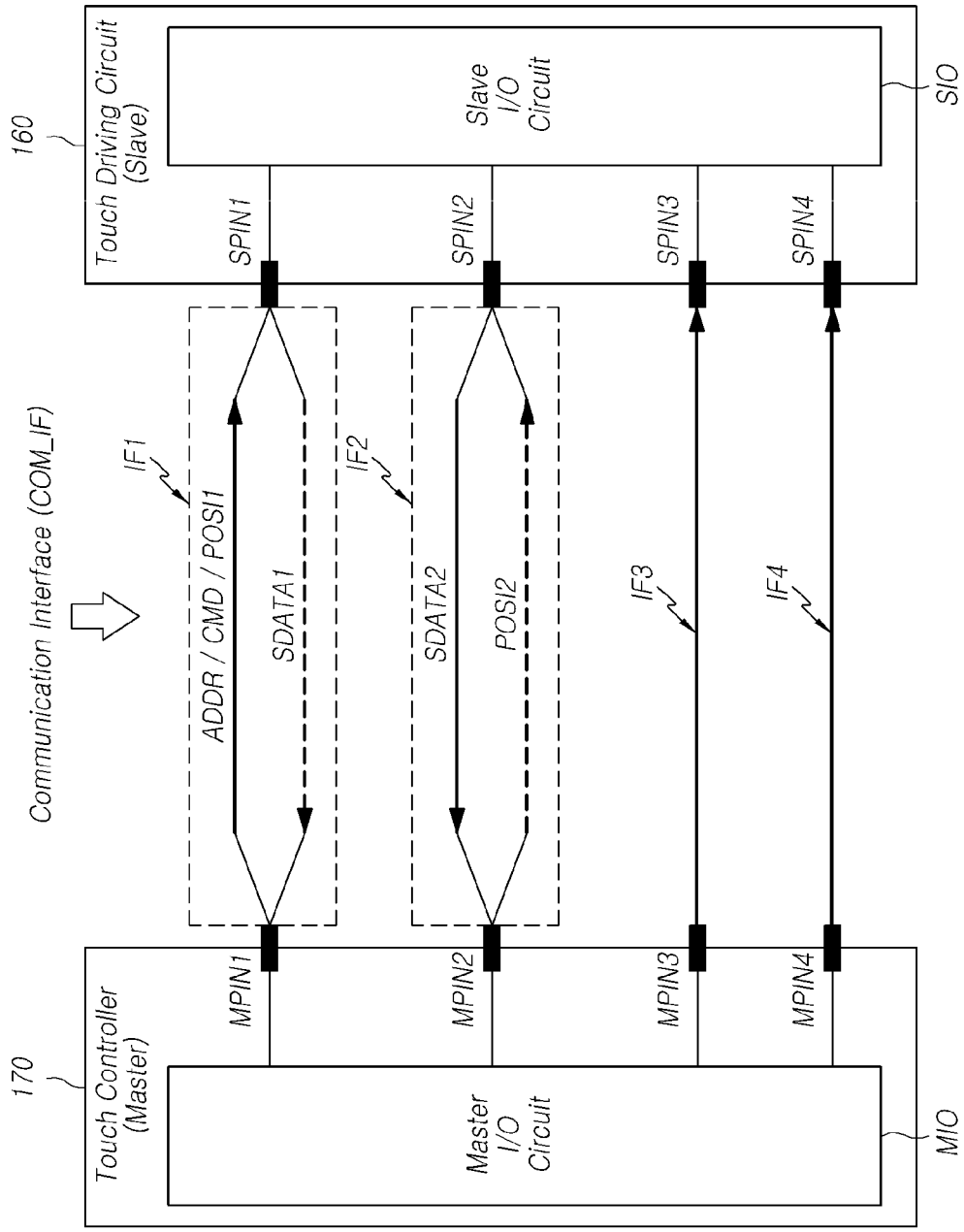
FIG. 4 is a diagram illustrating a communication interface between a touch controller and a touch driving circuit according to embodiments of the present disclosure.
Figure 5:
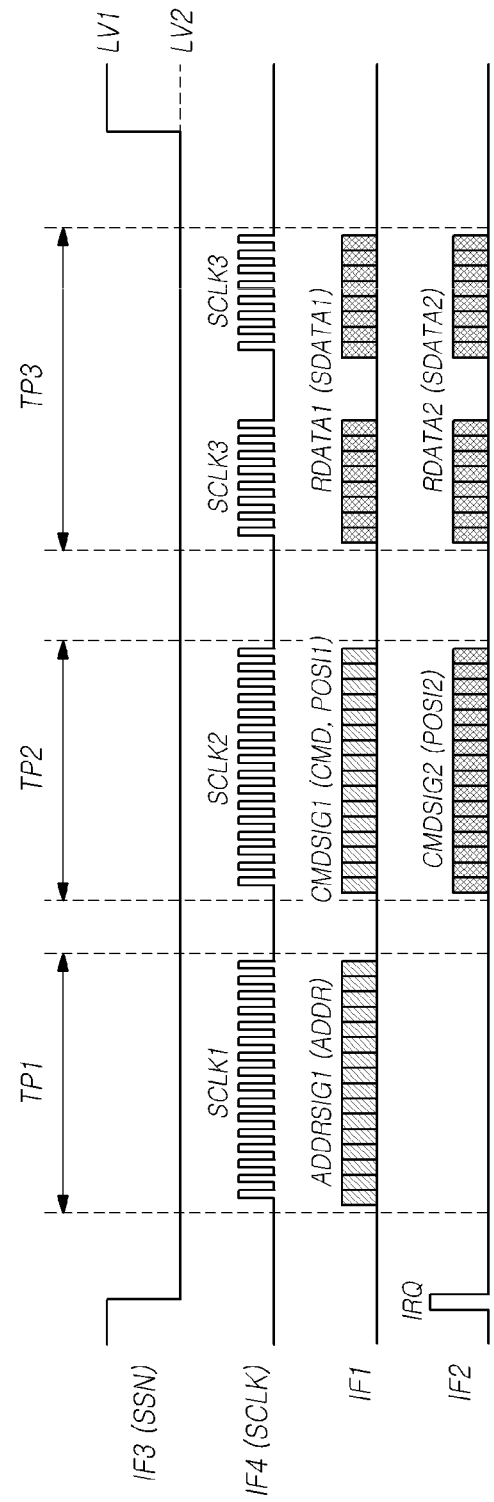
FIG. 5 is a diagram illustrating a fast transmission protocol between a touch controller and a touch driving circuit according to embodiments of the present disclosure.
Figure 6:
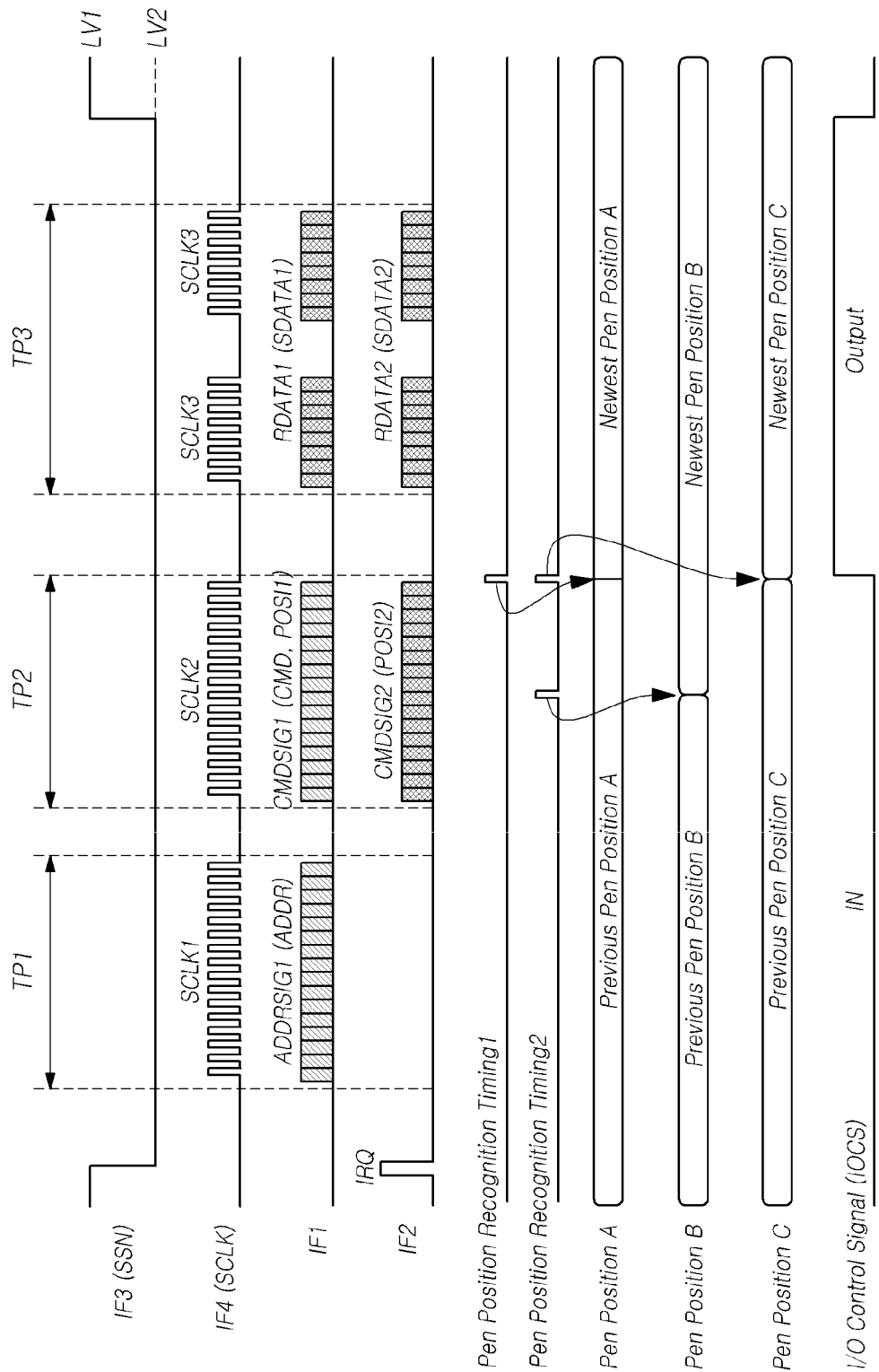
FIG. 6 is a diagram illustrating update of pen position information based on the fast transmission protocol illustrated in FIG. 5.
Figure 7:
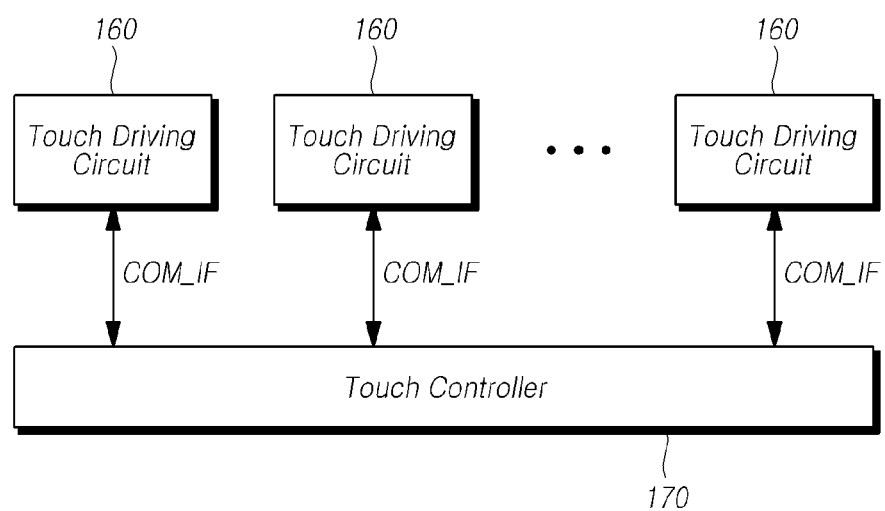
FIG. 7 is a diagram illustrating communication interfaces between a plurality of touch driving circuits and a touch controller which operate in accordance with the fast transmission protocol illustrated in FIG. 5.

FIG. 4 is a diagram illustrating a communication interface COM_IF between the touch controller 170 and the touch driving circuit 160 according to embodiments of the present disclosure. FIG. 5 is a diagram illustrating a fast transmission protocol between the touch controller 170 and the touch driving circuit 160 according to embodiments of the present disclosure. FIG. 6 is a diagram illustrating update of pen position information based on the fast transmission protocol illustrated in FIG. 5. FIG. 7 is a diagram illustrating a communication interface COM_IF between a plurality of touch driving circuits 160 and the touch controller 170 which operate in accordance with the fast transmission protocol illustrated in FIG. 5.

Referring to FIGS. 4 to 6, in the touch display device 100 according to the embodiments of the present disclosure, the touch driving circuit 160 and the touch controller 170 transmit and receive various types of information and data required for touch sensing via the communication interface COM_IF.

In the touch display device 100 according to the embodiments of the present disclosure, the touch controller 170 and the touch driving circuit 160 perform a master-slave operation. At the time of communication between the touch driving circuit 160 and the touch controller 170, the touch controller 170 serves as a master and the touch driving circuit 160 serves as a slave. Here a master and a slave can represent an entity (master) that controls another entity (slave).

The communication interface COM_IF between the touch driving circuit 160 and the touch controller 170 includes first to fourth interfaces IF1, IF2, IF3, and IF4. The first interface IF1 and the second interface IF2 out of the first to fourth interfaces IF1, IF2, IF3, and IF4 are interfaces in which full-duplex transmission is possible.

Referring to FIGS. 4 to 6, the touch controller 170 outputs one or more pieces of first pen position information POSH to a first master pin MPIN1 corresponding to one end of the first interface IF1 and outputs one or more pieces of second pen position information POSI2 other than the one or more pieces of first pen position information POSH to a second master pin MPIN2 corresponding to one end of the second interface IF2

Referring to FIGS. 4 to 6, the touch driving circuit 160 receives the first pen position information POSH from a first slave pin SPIN1 corresponding to the other end of the first interface IF1 and receives the second pen position information POSI2 from a second slave pin SPIN2 corresponding to the other end of the second interface IF2.

Referring to FIGS. 4 to 6, the touch driving circuit 160 senses a pen signal using the touch electrodes TE which are arranged in one or more local areas in the touch panel 150 indicated by the first pen position information POSH and the second pen position information POSI2 and generates sensing data as a result of sensing.

Referring to FIGS. 4 to 6, the touch driving circuit 160 outputs first sensing data SDATA1 out of the sensing data generated as the result of sensing to the first slave pin SPIN1 and outputs second sensing data SDATA2 out of the sensing data to the second slave pin SPIN2.

Referring to FIGS. 4 to 6, the touch controller 170 receives the first sensing data SDATA1 from the first master pin MPIN1 and receives the second sensing data SDATA2 from the second master pin MPIN2.

Since the first sensing data SDATA1 and the second sensing data SDATA2 out of the sensing data generated as the result of sensing are divided and simultaneously transmitted via the first interface IF1 and the second interface IF2, respectively, as described above, the touch driving circuit 160 can fast transmit the whole sensing data to the touch controller 170 for a shorter time. Accordingly, the touch controller 170 can more rapidly acquire information on a touch and/or a touch position of a pen touch.

The first sensing data SDATA1 and the second sensing data SDATA2 out of the sensing data generated as the result of sensing can be divided and simultaneously transmitted via the first interface IF1 and the second interface IF2, respectively, as described above because the first interface IF1 and the second interface IF2 are embodied as interfaces in which full-duplex transmission is possible.

Referring to FIG. 4, the touch controller 170 according to embodiments of the present disclosure includes the first master pin MPIN1 corresponding to the first interface IF1, the second master pin MPIN2 corresponding to the second interface IF2, and a master input/output circuit MIO for inputting/outputting a signal.

The master input/output circuit MIO outputs the first pen position information POSH to the touch driving circuit 160 via the first master pin MPIN1 and outputs the second pen position information POSI2 other than the first pen position information POSI1 to the touch driving circuit 160 via the second master pin MPIN2.

The master input/output circuit MIO receives the first sensing data SDATA1 out of the sensing data, which is generated by causing the touch driving circuit 160 to sense a pen signal using the touch electrodes TE which are arranged in one or more local areas in the touch panel 150 indicated by the first pen position information POSH and the second pen position information POSI2, from the touch driving circuit 160 via the first master pin MPIN1.

The master input/output circuit MIO receives the second sensing data SDATA2 other than the first sensing data SDATA1 out of the sensing data from the touch driving circuit 160 via the second master pin MPIN2 while receiving the first sensing data SDATA1 from the touch driving circuit 160 via the first master pin MPIN1.

Referring to FIG. 4, the touch controller 170 according to embodiments of the present disclosure further includes a third master pin MPIN3 corresponding to a third interface IF3 and a fourth master pin MPIN4 corresponding to a fourth interface IF4.

The master input/output circuit MIO outputs a slave selection signal SSN to the touch driving circuit 160 via the third master pin MPIN3 and outputs a clock signal SCLK to the touch driving circuit 160 via the fourth master pin MPIN4.

When one master and two or more slaves cooperate with each other, for example, when a plurality of touch driving circuits 160 and the touch controller 170 cooperate with each other, the slave selection signal SSN is a signal for selecting one of two or more slaves. The touch driving circuit 160 recognizes a timing at which a signal is to be transmitted to and received from the touch controller 170 in accordance with the slave selection signal SSN received from the touch controller 170.

Referring to FIG. 4, the touch driving circuit 160 according to embodiments of the present disclosure includes the first slave pin SPIN1 corresponding to the other end out of one end and the other end of the first interface IF1, the second slave pin SPIN2 corresponding to the other end out of one end of the other end of the second interface IF2, and a slave input/output circuit SIO for inputting/outputting a signal.

The slave input/output circuit SIO receives the first pen position information POSH from the touch controller 170 via the first slave pin SPIN1 and receives the second pen position information POSI2 other than the first pen position information POSH from the touch controller 170 via the second slave pin SPIN2.

The slave input/output circuit SIO outputs the first sensing data SDATA1 out of the sensing data which is generated as the result of sensing a pen signal using the touch electrodes TE which are arranged in one or more local areas in the touch panel 150 indicated by the first pen position information POSH and the second pen position information POSI2, to the touch controller 170 via the first slave pin SPIN1.

The slave input/output circuit SIO outputs the second sensing data SDATA2 other than the first sensing data SDATA1 out of the sensing data to the touch controller 170 via the second slave pin SPIN2 while outputting the first sensing data SDATA1 to the touch controller 170 via the first slave pin SPIN1.

The touch driving circuit 160 according to embodiments of the present disclosure further includes a third slave pin SPIN3 corresponding to the third interface IF3 and a fourth slave pin SPIN4 corresponding to the fourth interface IF4.

The slave input/output circuit SIO receives the slave selection signal SSN from the touch controller 170 via the third slave pin SPIN3 and receives the clock signal SCLK from the touch controller 170 via the fourth slave pin SPIN4.

The clock signal SCLK is a signal for synchronization of a signal which is transmitted between the touch controller 170 and the touch driving circuit 160. The touch controller 170 outputs various signals in synchronization with the clock signal SCLK. The touch driving circuit 160 outputs various signals in synchronization with the clock signal SCLK.

Referring to FIGS. 4 and 5, the touch controller 170 outputs a first command signal CMDSIG1 including the first pen position information POSI1 along with command information CMD to the first master pin MPIN1.

The touch controller 170 outputs a second command signal CMDSIG2 including the second pen position information POSI2 to the second master pin MPIN2 while outputting the first command signal CMDSIG1 to the first master pin MPIN1.

Here, the second command signal CMDSIG2 can include the second pen position information POSI2 but may not include actual command information CMD. When an amount of command information CMD is large, the command information CMD can be distributed to the first command signal CMDSIG1 and the second command signal CMDSIG2 and transmitted.

The touch driving circuit 160 receives the first command signal CMDSIG1 including the first pen position information POSI1 from the first slave pin SPIN1 and receives the second command signal CMDSIG2 including the second pen position information POSI2 from the second slave pin SPIN2.

Accordingly, the touch controller 170 can provide two or more pieces of pen position information POSI1 and POSI2 within a short time, and the touch driving circuit 160 can start a subsequent process using the two or more pieces of pen position information POSI1 and POSI2 at an earlier time point.

Here, one or more pieces of first pen position information POSI1 and one or more pieces of second pen position information POSI2 can be pen position information on the same pen 20 or can be pen position information on different pens 20.

For example, when one piece of first pen position information POSI1 and two pieces of second pen position information POSI2 are provided from the touch controller 170 to the touch driving circuit 160, the one piece of first pen position information POSI1 and the two pieces of second pen position information POSI2 can be position information on three pens 20, can be position information on one pen 20, can be position information on two pens 20, or can be position information on four or more pens 20.

Referring to FIG. 6, the touch driving circuit 160 changes existing first pen position information on the basis of the first pen position information POSH included in the first command signal CMDSIG1 which is input from the first slave pin SPIN1' and changes existing second pen position information on the basis of the second pen position information POSI2 included in the second command signal CMDSIG2 which is input from the second slave pin SPIN2.

This example will be described below with reference to FIG. 6.

Referring to FIG. 6, it is assumed that the touch driving circuit 160 stores and manages previous pen positions A, B, and C and receives the first command signal CMDSIG1 including one piece of first pen position information POSI1 and the second command signal CMDSIG2 including two pieces of second pen position information POSI2. It is also assumed that the one piece of first pen position information POSH is included in a rear part of the first command signal CMDSIG1 and the two pieces of second pen position information POSI2 are included in a front part and a rear part of the second command signal CMDSIG2.

Referring to FIG. 6, at pen position recognition timing 2, the touch driving circuit 160 recognizes one piece of second pen position information POSI2 at a timing corresponding to the front pat of the second command signal CMDSIG2, changes a previous pen position B which has been previously stored and managed to a newest pen position B using the newly recognized one piece of second pen position information POSI2, and stores the changed pen position.

Referring to FIG. 6, at pen position recognition timing 2, the touch driving circuit 160 recognizes the other piece of second pen position information POSI2 at a timing corresponding to the rear pat of the second command signal CMDSIG2, changes a previous pen position C which has been previously stored and managed to a newest pen position C using the newly recognized other piece of second pen position information POSI2, and stores the changed pen position.

Referring to FIG. 6, at pen position recognition timing 1, the touch driving circuit 160 recognizes one piece of first pen position information POSH at a timing corresponding to the rear pat of the first command signal CMDSIG1, changes a previous pen position A which has been previously stored and managed to a newest pen position A using the newly recognized one piece of first pen position information POSI1, and stores the changed pen position.

Referring to FIGS. 4 to 6, the touch controller 170 outputs a first address signal ADDRSIG1 including address information ADDR to the first master pin MPIN1. Accordingly, the touch driving circuit 160 receives the first address signal ADDRSIG1 including the address information ADDR from the first slave pin SPIN1.

Referring to FIGS. 4 to 6, the touch controller 170 outputs the slave selection signal SSN to the third master pin MPIN3 corresponding to one end of the third interface IF3. Accordingly, the touch driving circuit 160 receives the slave selection signal SSN from the third slave pin SPIN3 corresponding to the other end of the third interface IF3.

Referring to FIGS. 5 and 6, the slave selection signal SSN includes a first signal level LV1 and a second signal level LV2 which are different from each other.

The first signal level LV1 is a signal level indicating non-selection and the second signal level LV2 is a signal level indicating selection. For example, the second signal level LV2 can be a signal level with a voltage lower than that of the first signal level LV1. In some cases, the second signal level LV2 can be a signal level with a voltage higher than that of the first signal level LV1.

Referring to FIGS. 5 to 7, the slave selection signal SSN is a signal for selecting one of a plurality of touch driving circuits 160 corresponding to a plurality of slaves. When the signal level of the input slave selection signal SSN is the second signal level LV2, each touch driving circuit 160 can recognize that the touch driving circuit 160 is selected by the touch controller 170 and has to perform a cooperating operation for transmission of a signal with the touch controller 170.

Referring to FIG. 7, the touch controller 170 can perform a master-slave operation with each touch driving circuit 160 via the corresponding communication interface COM_IF to perform transmission and reception of a signal. Here, the communication interface COM_IF includes all of the first to fourth interfaces IF1 to IF4 which are mentioned above.

Referring to FIGS. 5 and 6, the period in which the slave selection signal SSN has the second signal level LV2 includes a first period TP1, a second period TP2, and a third period TP3.

In the first period TP1, the first address signal ADDRSIG1 is transmitted from the touch controller 170 to the touch driving circuit 160 via the first interface IF1.

In the second period TP2, the first pen position information POSH included in the first command signal CMDSIG1 is transmitted from the touch controller 170 to the touch driving circuit 160 via the first interface IF1 and the second pen position information POSI2 is transmitted from the touch controller 170 to the touch driving circuit 160 via the second interface IF2.

In the third period TP3, the first sensing data SDATA1 is transmitted from the touch driving circuit 160 to the touch controller 170 via the first interface IF1 and the second sensing data SDATA2 other than the first sensing data SDATA1 is transmitted from the touch driving circuit 160 to the touch controller 170 via the second interface IF2.

Referring to FIGS. 5 and 6, the touch controller 170 can provide the clock signal SCLK to the touch driving circuit 160 via the fourth interface IF4. The clock signal SCLK serves to synchronize timings for transmission of a signal between the touch controller 170 and the touch driving circuit 160.

Referring to FIGS. 5 and 6, the touch controller 170 outputs a first clock signal SCLK1, a second clock signal SCLK2, and a third clock signal SCLK3 to the fourth master pin MPIN4 corresponding to one end of the fourth interface IF4.

The touch driving circuit 160 receives the first clock signal SCLK1, the second clock signal SCLK2, and the third clock signal SCLK3 from the fourth slave pin SPIN4 corresponding to the other end of the fourth interface IF4.

The period in which the first clock signal SCLK1 is transmitted from the touch controller 170 to the touch driving circuit 160 via the fourth interface IF4 includes the first period TP1. For example, the first clock signal SCLK1 serves to synchronize a signal for the first period TP1 in which the address information ADDR is transmitted.

The period in which the second clock signal SCLK2 is transmitted from the touch controller 170 to the touch driving circuit 160 via the fourth interface IF4 includes the second period TP2. For example, the second clock signal SCLK2 serves to synchronize a signal for the second period TP2 in which the command information CMD is transmitted.

The period in which the third clock signal SCLK3 is transmitted from the touch controller 170 to the touch driving circuit 160 via the fourth interface IF4 includes the third period TP3. For example, the third clock signal SCLK3 serves to synchronize a signal for the third period TP3 in which data is transmitted. Here, actual data can be read data RDATA1 and RDATA2 which is transmitted from the touch driving circuit 160 to the touch controller 170 such as the first and second sensing data SDATA1 and SDATA2 which are mentioned above. Alternatively, actual data can be write data which is transmitted from the touch controller 170 to the touch driving circuit 160.

As described above, the touch controller 170 can supply the pen position information POSH and POSI2 to the touch driving circuit 160 using the first and second command signals CMDSIG1 and CMDSIG2 via the first and second interfaces IF1 and IF2 in the second period TP2 in which command information CMD is transmitted.

For example, the touch controller 170 can supply pen position information included in write data to the touch driving circuit 160 via the first and second interfaces IF1 and IF2 in the third period PT3 which is a data transmission period.

Referring to FIGS. 5 and 6, the first clock signal SCLK1, the second clock signal SCLK2, and the third clock signal SCLK3 each include a plurality of pulses.

A signal gap between the first clock signal SCLK1 and the second clock signal SCLK2 and a signal gap between the second clock signal SCLK2 and the third clock signal SCLk3 each are greater than a pulse gap in a plurality of pulses included in each of the first clock signal SCLK1, the second clock signal SCLK2, and the third clock signal SCLK3.

Referring to FIG. 6, the touch driving circuit 160 can control a signal input timing and a signal output timing using an input/output (I/O) control signal IOCS. The input/output control signal IOCS can be supplied from the touch controller 170 to the touch driving circuit 160.

Referring to FIGS. 5 and 6, the touch driving circuit 160 can transmit an interrupt request IRQ to the touch controller 170 via the second interface IF2. On the other hand, the touch controller 170 can also transmit the interrupt request IRQ to the touch driving circuit 160.

The touch display device 100 according to the embodiments of the present disclosure includes two process modes including a normal mode and an interrupt mode in view of the master-slave operation. The interrupt mode is a mode in which a process based on the interrupt request IRQ is performed when an interrupt request IRQ is issued, and the normal mode is a mode in which a process determined in a normal or general state is performed when an interrupt request IRQ is not issued.

In the normal mode, an internal process time of the touch controller 170 is longer than that in the interrupt mode. Accordingly, the touch display device 100 according to embodiments of the present disclosure can perform an operation requiring a fast process such as a touch sensing operation in the interrupt mode.

Figure 8:
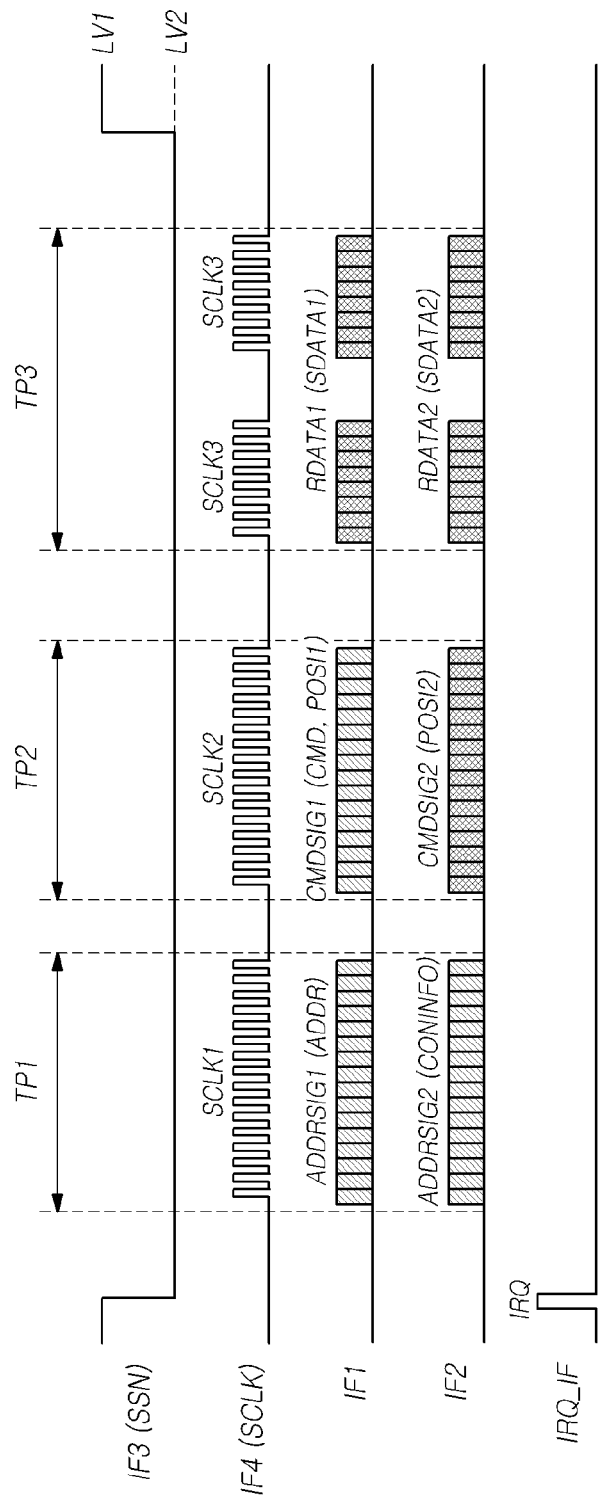
FIG. 8 is a diagram illustrating a fast transmission protocol between a touch controller and a touch driving circuit according to embodiments of the present disclosure.
Figure 9:
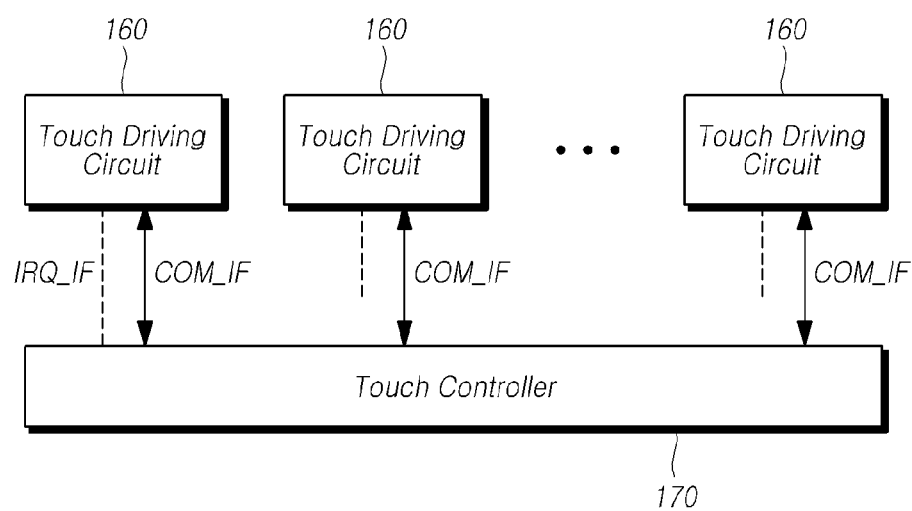
FIG. 9 is a diagram illustrating communication interfaces between a plurality of touch driving circuits and a touch controller which operate in accordance with the fast transmission protocol illustrated in FIG. 8.

FIG. 8 is a diagram illustrating a fast transmission protocol between the touch controller 170 and the touch driving circuit 160 according to embodiments of the present disclosure. FIG. 9 is a diagram illustrating the communication interface COM_IF between a plurality of touch driving circuits 160 and the touch controller 170 which operate in accordance with the fast transmission protocol illustrated in FIG. 8.

Referring to FIG. 8, the touch controller 170 can output a second address signal ADDRSIG2 including control information CONINFO to the second master pin MPIN2 while outputting the first address signal ADDRSIG1 including address information ADDR to the first master pin MPIN1.

For example, the control information CONINFO included in the second address signal ADDRSIG2 can include one or more of address information ADDR other than the address information ADDR included in the first address signal ADDRSIG1, driving control information for sensing a pen touch, and pen ID information and pen number information which has been previously allocated or which is available. As described above, the control information CONINFO included in the second address signal ADDSIG2 may or may not include address information ADDR.

Referring to FIG. 8, the touch driving circuit 160 receives the second address signal ADDRSIG2 including the control information CONINFO from the second slave pin SPIN2 via the second interface IF2 while receiving the first address signal ADDRSIG1 from the first slave pin SPIN' via the first interface IF1.

Referring to FIG. 8, the touch driving circuit 160 can transmit an interrupt request IRQ to the touch controller 170 via an additional interface IRQ_IF other than the first interface IF1 and the second interface IF2.

When the interrupt request IRQ is received via the additional interface IRQ_IF, the touch controller 170 can perform an operation which is defined by the interrupt request IRQ (for example, an operation of reading sensing data and transmission of address information and command information therefor).

As illustrated in FIG. 8, when the second address signal ADDRSIG2 is transmitted from the touch controller 170 to the touch driving circuit 160 via the second interface IF2 in the first period TP1, there is no temporal margin that the touch driving circuit 160 outputs an interrupt request IRQ before outputting the second address signal ADDRSIG2 from the touch controller 170. Accordingly, the interrupt request IRQ is transmitted from the touch driving circuit 160 to the touch controller 170 via an additional interface IRQ_IF.

The touch controller 170 can further include an additional master pin corresponding to one end of the additional interface IRQ_IF other than the first to fourth master pins MPIN1 to MPIN4 which are mentioned above. The touch driving circuit 160 can further include an additional slave pin corresponding to the other end of the additional interface IRQ_IF in addition to the first to fourth slave pins SPIN1 to SPIN4 which are mentioned above.

Referring to FIG. 9, the touch controller 170 can perform a master-slave operation with a plurality of touch driving circuits 160 via the additional communication interface COM_IF to transmit and receive a signal. Here, the communication interface COM_IF includes all the first to fourth interfaces IF1 to IF4 which are mentioned above.

Additional interfaces IRQ_IF can be provided between all of the plurality of touch driving circuits 160 and the touch controller 170 or an additional interface IRQ_IF can be provided only between some of the plurality of touch driving circuits 160 and the touch controller 170.

Figure 10:
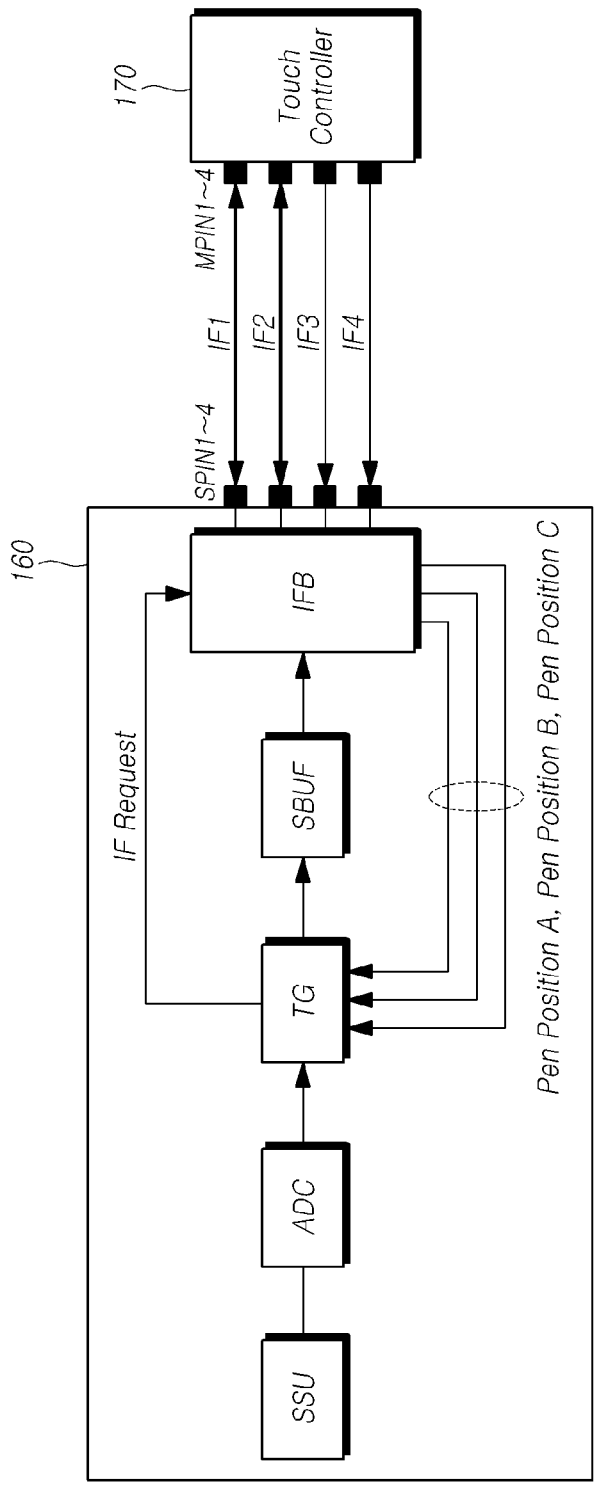
FIG. 10 is a diagram illustrating internal elements of a touch driving circuit according to embodiments of the present disclosure.

FIG. 10 is a diagram illustrating internal elements of a touch driving circuit 160 according to embodiments of the present disclosure.

Referring to FIG. 10, the touch driving circuit 160 includes a sensing unit SSU that is electrically connected to a plurality of touch electrodes TE in the touch panel 150 via a plurality of touch lines TL, senses one or more of the plurality of touch electrodes TE, and outputs an analog sensing value, an analog-to-digital converter ADC that converts the analog sensing value output from the sensing unit SSU into a digital sensing value and outputs the digital sensing value, a control unit TG that controls the overall operation (a slave operation) of the touch driving circuit 160, a buffer SBUF that stores various types of information and data which are to be transmitted to the touch controller 170 as a master, and an interface block IFB that performs an interface operation with the touch controller 170 via a communication interface COM_IF.

Referring to FIG. 10, as described above, the touch driving circuit 160 includes a first slave pin SPIN' corresponding to the first interface IF1, a second slave pin SPIN2 corresponding to the second interface IF2, a third slave pin SPIN3 corresponding to the third interface IF3, and a fourth slave pin SPIN4 corresponding to the fourth interface IF4.

The first and second interfaces IF1 and IF2 are bidirectional transmission interfaces. Accordingly, the first slave pin SPIN1 and the second slave pin SPIN2 are pins in which signal inputs ADDRSIG1, ADDRSIG2, CMDSIG1, and CMDSIG2 and signal outputs SDATA1 and SDATA2 are all possible.

The third and fourth interfaces IF3 and IF4 are unidirectional transmission interfaces. Accordingly, the third slave pin SPIN3 and the fourth slave pin SPIN4 are pins in which only signal inputs SSN and SCLK are possible.

Referring to FIG. 10, the touch controller 170 includes a first master pin MPIN1 corresponding to the first interface IF1, a second master pin MPIN2 corresponding to the second interface IF2, a third master pin MPIN3 corresponding to the third interface IF3, and a fourth master pin MPIN4 corresponding to the fourth interface IF4.

The first and second interfaces IF1 and IF2 are bidirectional transmission interfaces. Accordingly, the first master pin MPIN1 and the second master pin MPIN2 are pins in which signal inputs SDATA1 and SDATA2 and signal outputs ADDRSIG1, ADDRSIG2, CMDSIG1, and CMDSIG2 are all possible.

The third and fourth interfaces IF3 and IF4 are unidirectional transmission interfaces. Accordingly, the third master pin MPIN3 and the fourth master pin MPIN4 are pins in which only signal outputs SSN and SCLK are possible.

Referring to FIG. 10, the touch controller 170 can detect a plurality of pen positions (for example, pen positions A, B, and C) using the sensing data received from the touch driving circuit 160 via the first and second interfaces IF1 and IF2 and transmit pen position information POSH and POSI2 thereof to the touch driving circuit 160 via the first and second interfaces IF1 and IF2 for a short time.

Accordingly, the interface block IFB of the touch driving circuit 160 receives the pen position information POSH and POSI2 of the plurality of pen positions (for example, pen positions A, B, and C) and transmits the input pen position information to the control unit TG.

The control unit TG of the touch driving circuit 160 can control the sensing operation, the signal transmitting/receiving operation, and the like using the pen position information POSH and POSI2 of the plurality of pen positions (for example, pen positions A, B, and C).

The control unit TG of the touch driving circuit 160 can supply an interface request required for the interface operation with the touch controller 170 to the interface block IFB.

Figure 11:
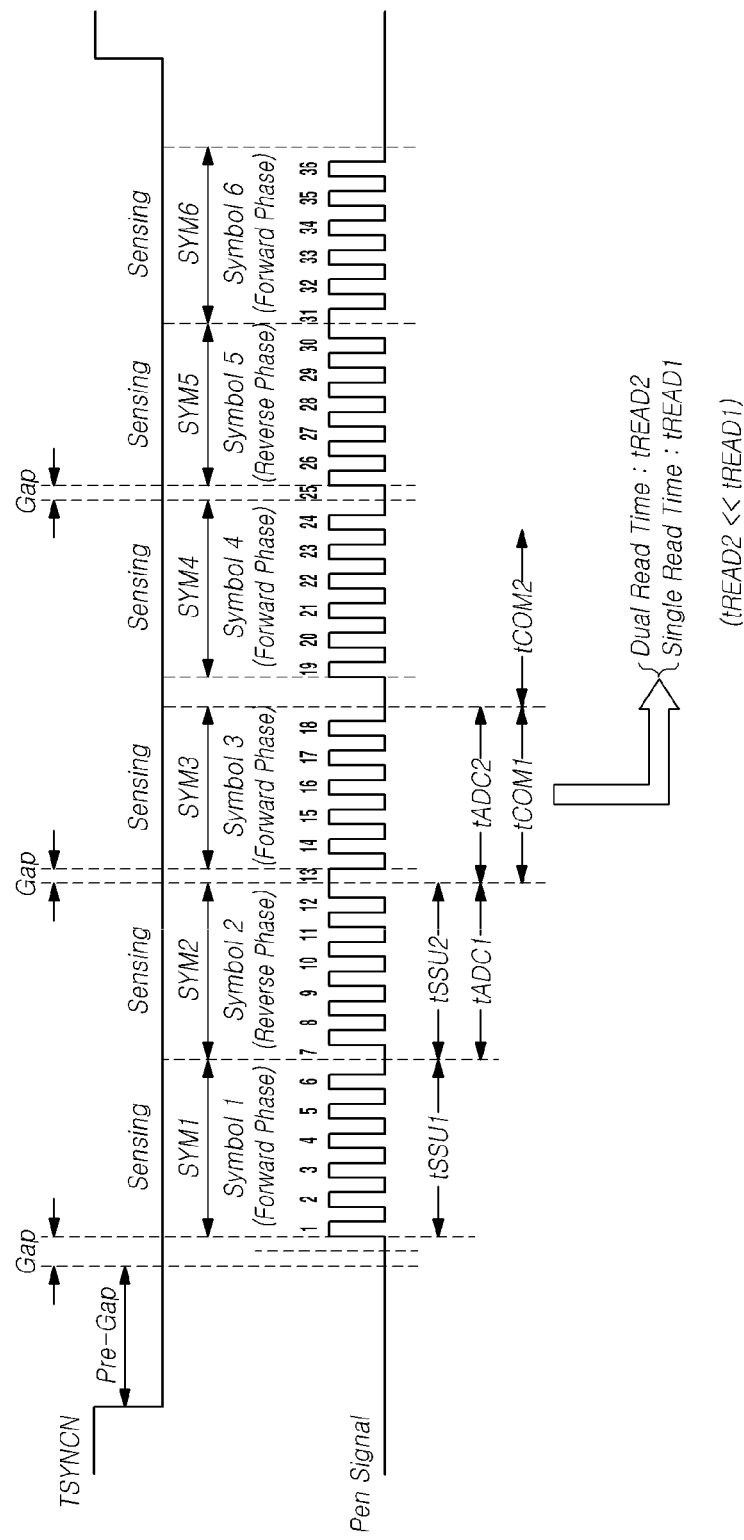
FIG. 11 is a diagram illustrating a pen signal which is output from a pen in a touch time section of a touch display device according to embodiments of the present disclosure.
Figure 12:
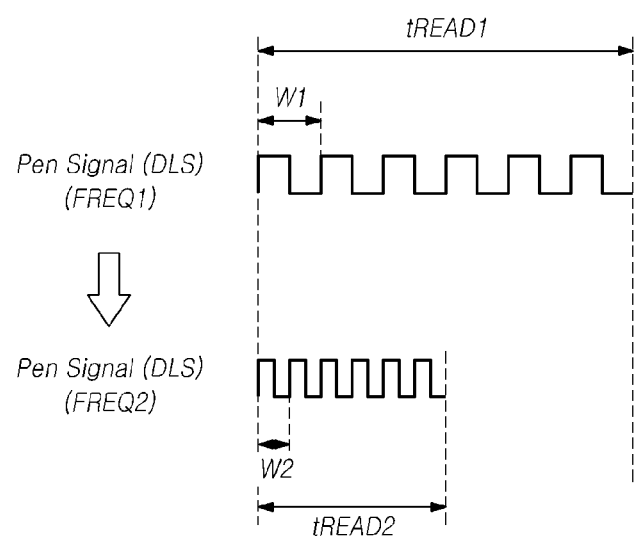
FIG. 12 is a diagram illustrating a frequency of a pen signal when a fast transmission protocol between the touch controller and the touch driving circuit according to embodiments of the present disclosure is used.

FIG. 11 is a diagram illustrating a pen signal which is output from the pen 20 in a touch time section of the touch display device 100 according to embodiments of the present disclosure. FIG. 12 is a diagram illustrating a frequency of a pen signal when a fast transmission protocol between the touch controller 170 and the touch driving circuit 160 according to embodiments of the present disclosure is used.

Referring to FIG. 11, a touch driving period for touch sensing is defined by a touch synchronization signal TSYNCN. The touch synchronization signal TSYNCN have a first level and a second level, where the first level defines a display driving period and the second level defines the touch driving period. Referring to FIG. 11, the second level has a voltage value lower than that of the first level.

The touch driving period defined by the touch synchronization signal TSYNCN can be a period in which a touch of a finger 10 is sensed. In this case, the touch driving circuit 160 can apply a touch driving signal with a varying voltage level to the touch electrodes TE of the touch panel 150.

The touch driving period defined by the touch synchronization signal TSYNCN can be a period in which a touch of the pen 20 is sensed. This period can be an uplink period in which the touch driving circuit 160 transmits an uplink signal ULS to the pen 20 or a downlink period in which the touch driving circuit 160 receives a downlink signal DLS from the pen 20.

In the uplink period, the touch driving circuit 160 can apply a beacon signal including various types of pen driving control information as the uplink signal ULS to the touch electrodes TE of the touch panel 150 to supply the beacon signal to a near pen 20.

In the downlink period, the pen 20 can output various pen signals. Various pen signals output from the pen 20 are applied to one or more touch electrodes TE of the touch panel 150. The touch driving circuit 160 can sense the pen signal applied to the one or more touch electrodes TE and generate sensing data.

In the uplink period, the touch driving circuit 160 can apply a signal with a varying voltage level to the touch electrodes TE of the touch panel 150 or can apply a DC voltage with a constant voltage level to the touch electrodes TE of the touch panel 150.

The downlink period can be one of a pen position sensing period in which a pen position of a pen 20 is sensed, a pen tilt sensing period in which a tilt of a pen 20 is sensed, and a pen data sensing period in which various types of accessory information of a pen 20 are sensed.

In the pen position sensing period and the pen tilt sensing period, a pen signal which is a downlink signal DLS output from the pen 20 can be a signal in which a voltage level varies regularly without any change in phase. In the pen data sensing period, a pen signal which is a downlink signal DLS output from the pen 20 can include a partial section in which a voltage level varies and a phase varies or a partial section in which a voltage level does not vary.

In the example illustrated in FIG. 11, the touch driving period defined by the touch synchronization signal TSYNCN is the pen data sensing period (the downlink period) and the pen signal is a pen data signal including various types of accessory information.

Referring to FIG. 11, in one touch driving period, a pen signal which is a pen data signal includes a plurality of symbol sections SYM1 to SYM6 indicating a plurality of symbols Symbols 1 to 6. Each of the plurality of symbol sections includes a plurality of pulses.

In the example illustrated in FIG. 11, in one touch driving period, a pen signal output from the pen 20 includes six symbol sections SYM1 to SYM6 corresponding to six symbols Symbols 1 to 6. In the pen signal, each of the six symbol sections SYM1 to SYM6 includes six pulses. Accordingly, in one touch driving period, the pen signal output from the pen 20 includes 36 pulses.

Referring to FIG. 11, the plurality of symbol sections SYM1 to SYM6 can have the same phase or different phases.

For example, some symbol sections SYM1, SYM3, SYM4, and SYM6 out of the plurality of symbol sections SYM1 to SYM6 have the same phase as an internal operation signal of the touch driving circuit 160. This signal state is referred to as a forward-phase state. The other symbol sections SYM2 and SYM5 out of the plurality of symbol sections SYM1 to SYM6 have a reverse phase of the phase of the internal operation signal of the touch driving circuit 160. This signal state is referred to as a reverse-phase state. The symbol sections SYM1, SYM3, SYM4, and SYM6 in the forward-phase state and the symbol sections SYM2 and SYM5 in the reverse-phase state have a reversed phase relationship in which the phases are reversed.

Referring to FIG. 11, in one touch driving period, the touch driving circuit 160 can independently sense and process the plurality of symbol sections SYM1 to SYM6 in a pen signal which is output from the pen 20 and applied to one or more touch electrodes TE in the touch panel 150.

In other words, the touch driving circuit 160 senses in a first symbol section SYM1 of the pen signal in a first sensing time tSSU1, senses a second symbol section SYM2 of the pen signal in a second sensing time tSSU2, senses a third symbol section SYM3 of the pen signal in a third sensing time, senses a fourth symbol section SYM4 of the pen signal in a fourth sensing time, senses a fifth symbol section SYM5 of the pen signal in a fifth sensing time, and senses a sixth symbol section SYM6 of the pen signal in a sixth sensing time.

The touch driving circuit 160 can convert an analog sensing value, which is obtained by sensing the first symbol section SYM1 of the pen signal in the first sensing time tSSU1, into a digital sensing value in a first conversion time tADC1.

The first conversion time tADC1 overlaps the second sensing time tSSU2. For example, the touch driving circuit 160 can convert an analog sensing value, which is obtained by sensing the first symbol section SYM1 of the pen signal, into a digital sensing value at the time of sensing the second symbol section SYM2 of the pen signal. Here, the first conversion time tADC1 has to be equal to or less than the second sensing time tSSU2.

The touch driving circuit 160 transmits the sensing data including the digital sensing value obtained in the first conversion time tADC1 to the touch controller 170 via the first interface IF1 and the second interface IF2 of the communication interface COM_IF in a first transmission time tCOM1.

The first transmission time tCOM1 overlaps a second conversion time tADC2. For example, the touch driving circuit 160 can transmit the sensing data corresponding to the first symbol section SYM1 of the pen signal to the touch controller 170 at the time of converting the analog sensing value obtained by sensing the first symbol section SYM1 of the pen signal into a digital sensing value. Here, the first transmission time tCOM1 has to be equal to or less than a second conversion time tADC2.

Referring to FIG. 11, in the first sensing time tSSU1, the touch driving circuit 160 can sense the first symbol section SYM1 of the pen signal which is applied to one or more touch electrodes TE in the touch panel 150.

In the first conversion time tADC1, the touch driving circuit 160 can convert an analog sensing value based on the result of sensing in the first sensing time tSSU1 into a digital sensing value and generate sensing data.

In the first transmission time tCOM1, the touch driving circuit 160 can divide the sensing data generated in the first conversion time tADC1 into first and second sensing data SDATA1 and SDATA2 and transmit the first and second sensing data SDATA1 and SDATA2 to the touch controller 170 via the first interface IF1 and the second interface IF2.

The first conversion time tDAC1 is equal to or less than the first sensing time tSSU1. The first transmission time tCOM1 is equal to or less than the first conversion time tADC1.

Referring to FIG. 11, in in the second sensing time tSSU2, the touch driving circuit 160 can sense the second symbol section SYM2 subsequent to the first symbol section SYM1 of the pen signal which is applied to one or more touch electrodes TE in the touch panel 150.

In the second conversion time tADC2, the touch driving circuit 160 can convert an analog sensing value based on the result of sensing in the second sensing time tSSU2 into a digital sensing value and generate sensing data.

In the second transmission time tCOM2, the touch driving circuit 160 can divide the sensing data generated in the second conversion time tADC2 into first and second sensing data SDATA1 and SDATA2 and transmit the first and second sensing data SDATA1 and SDATA2 to the touch controller 170 via the first interface IF1 and the second interface IF2.

The second sensing time tSSU2 overlaps the first conversion time tADC1. The second conversion time tADC2 overlaps the first transmission time tCOM1.

The first conversion time tADC1 is equal to or less than the second sensing time tSSU2. The first transmission time tCOM1 is equal to or less than the second conversion time tADC2.

Referring to FIG. 11, according to the above fast transmission protocol, the touch driving circuit 160 divides the sensing data acquired as the result of sensing into first and second sensing data SDATA1 and SDATA2 and transmit the first and second sensing data SDATA1 and SDATA2 to the touch controller 170 via the first interface IF1 and the second interface IF2. Accordingly, the transmission time tCOM1 in which the sensing data SDATA1 and SDATA2 corresponding to the read data is transmitted can be decreased to almost a half. Accordingly, it is possible to considerably decrease the time in which the touch controller 170 receives the sensing data SDATA1 and SDATA2 corresponding to the read data. Here, the above-mentioned time is a time for the touch controller 170 to read the sensing data SDATA1 and SDATA2 and is also referred to as a read time.

Referring to FIG. 11, when the touch driving circuit 160 transmits the sensing data acquired as the result of sensing to the touch controller 170 via only the second interface IF2, a single read time which is the read time has a single read time value tREAD1. When the touch driving circuit 160 separately transmits the sensing data acquired as the result of sensing to the touch controller 170 via the first interface IF1 and the second interface IF2, a dual read time which is the read time has a dual read time value tREAD2.

The dual read time value tREAD2 when the fast transmission protocol according to embodiments of the present disclosure is used is equal to or less than a half of the single read time value tREAD1 when the fast transmission protocol is not used.

Referring to FIG. 12, the number of pulses required for representing one symbol in a pen signal can be a predetermined number (for example, six).

Referring to FIG. 12, when the fast transmission protocol according to embodiments of the present disclosure is used, the read time of one symbol time can be decreased to the dual read time value tREAD2. Accordingly, in consideration of constraints of the number of pulses in each symbol section of the pen signal, a pen driving frequency FREQ2 can be increased to be two times the pen driving frequency FREQ1 in a single reading system to which embodiments of the present disclosure are not applied. Accordingly, it is possible to increase a pen sensing speed and to sense a pen 20 which operates at various pen driving frequencies.

Referring to FIG. 12, when the fast transmission protocol according to embodiments of the present disclosure is used, a pulse period W2 of a pen signal can be decreased to be equal to or less than a half of the pulse period W1 of the pen signal when the fast transmission protocol according to embodiments of the present disclosure is not used.

On the other hand, when the touch driving period defined by the touch synchronization signal TSYNCN starts, the pen 20 does not output a pen signal immediately but outputs the pen signal after a predetermined pre-delay time Pre-Gap has elapsed.

Accordingly, when the touch driving period defined by the touch synchronization signal TSYNCN starts, the touch driving circuit 160 can receive the pen signal after the predetermined pre-delay time Pre-Gap has elapsed. The predetermined pre-delay time Pre-Gap can be a period for causing the touch driving period to start stably or can be a period required for changing the touch driving circuit 160 to a state in which it can receive the pen signal.

Referring to FIG. 11, a predetermined time gap Gap can be provided between the plurality of symbol sections SYM1 to SYM6 constituting a pen signal. Alternatively, a predetermined time gap Gap can be provided between only some symbol sections of the plurality of symbol sections SYM1 to SYM6 constituting the pen signal. This time gap Gap can be a period required for stably performing a process of sensing a symbol section or can be a period required for changing the phases of the symbol sections.

Figure 13:
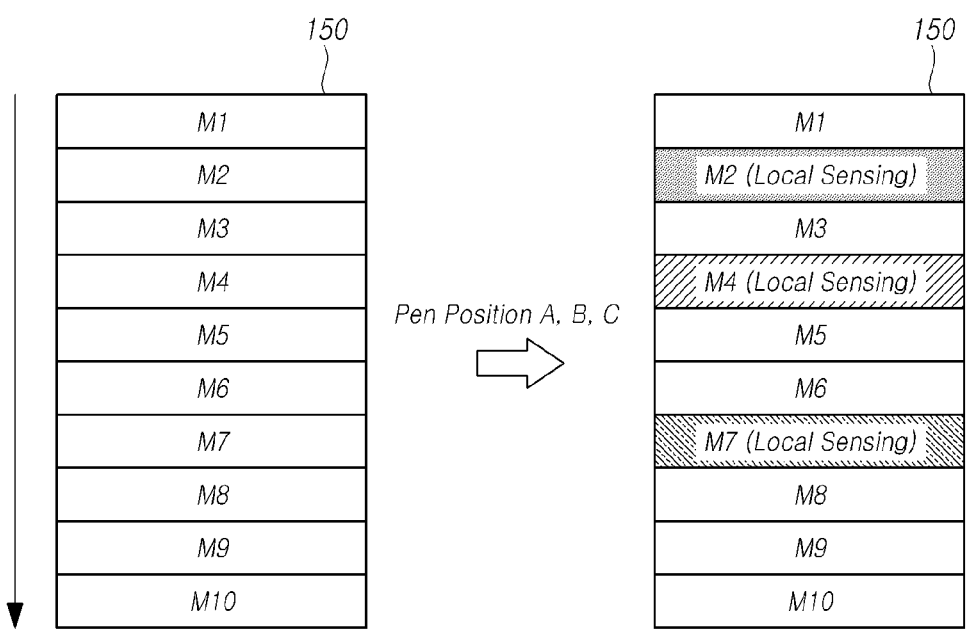
FIG. 13 is a diagram illustrating full sensing and local sensing in multiplexing driving of a touch display device according to embodiments of the present disclosure.
Figure 14:
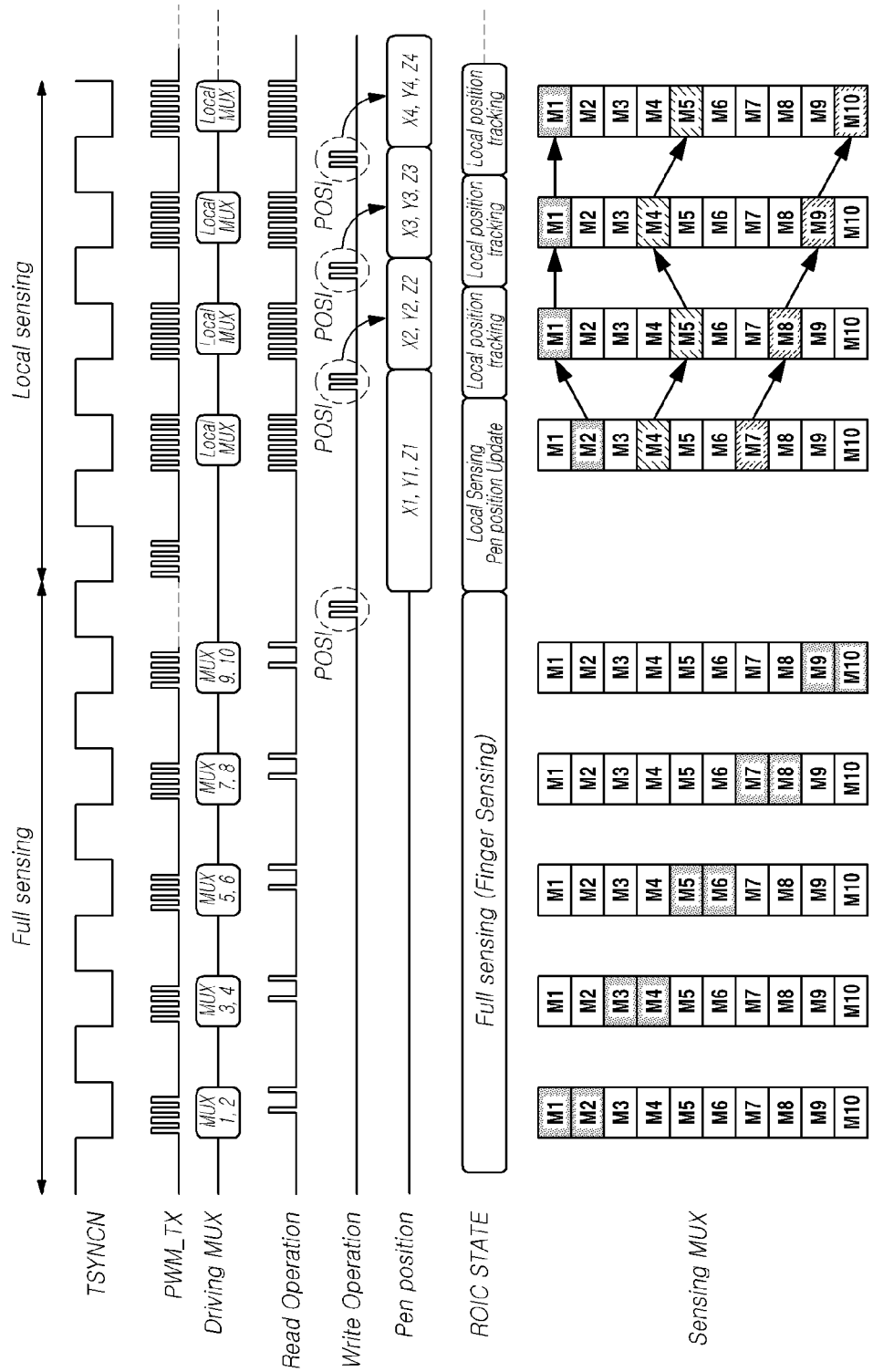
FIGS. 14 and 15 are diagrams illustrating an example in which a full-sensing mode is switched to a local-sensing mode when a fast transmission protocol according to embodiments of the present disclosure is not employed and when the fast transmission protocol is employed.
Figure 15:
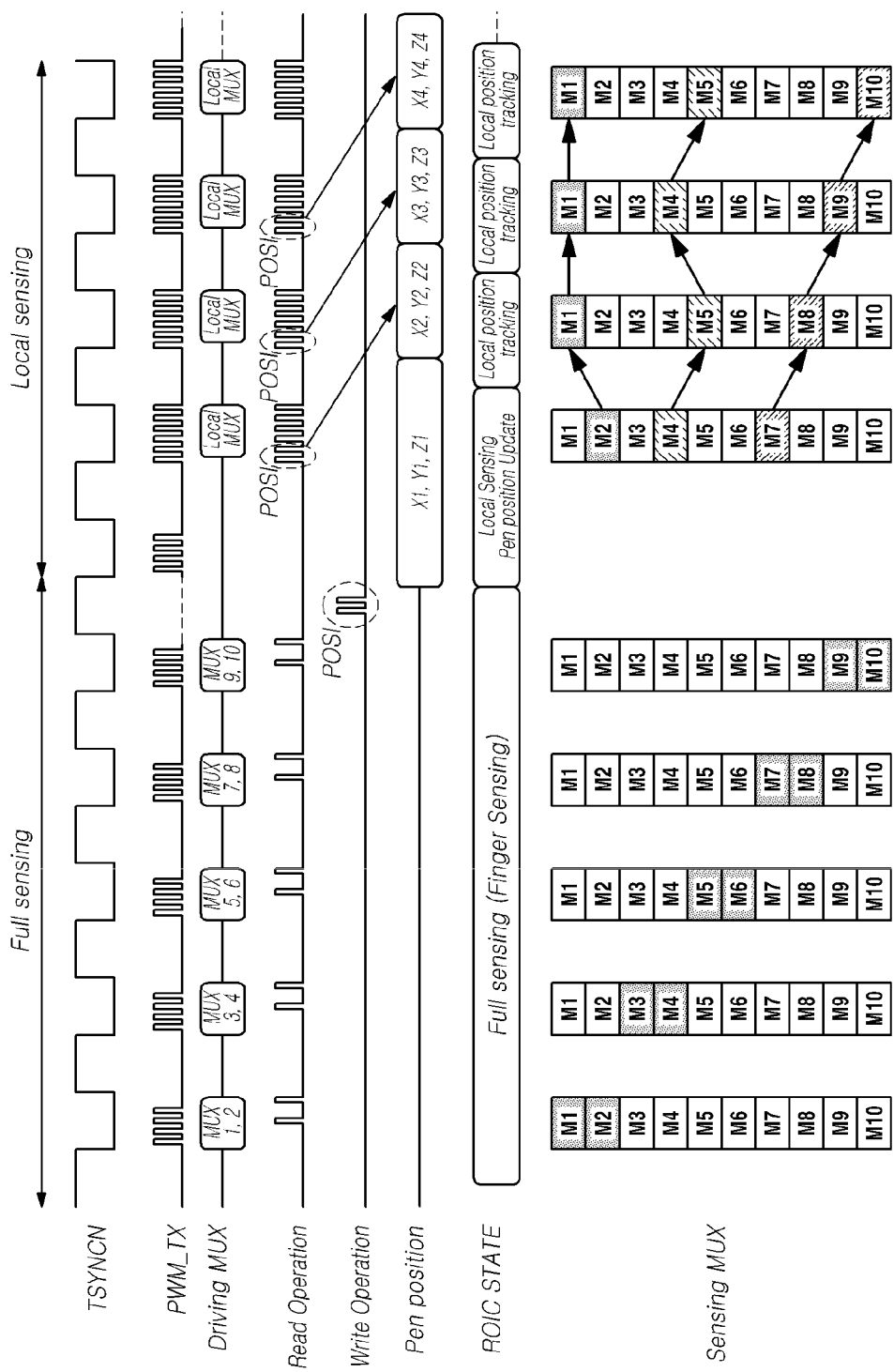

FIG. 13 is a diagram illustrating full sensing and local sensing in multiplexing driving of the touch display device 100 according to embodiments of the present disclosure. FIG. 14 is a diagram illustrating an example in which a full-sensing mode is switched to a local-sensing mode when the fast transmission protocol according to embodiments of the present disclosure is not employed. FIG. 15 is a diagram illustrating an example in which a full-sensing mode is switched to a local-sensing mode when the fast transmission protocol according to embodiments of the present disclosure is employed.

Referring to FIG. 13, the touch panel 150 is divided into a plurality of areas M1 to M10. For example, a plurality of touch electrodes TE in the touch panel 150 are arranged in a plurality of areas M1 to M10. The plurality of areas M1 to M10 are groups of the touch electrodes TE which can be simultaneously sensed. Each of the plurality of areas M1 to M10 includes a plurality of touch electrode rows.

The touch driving circuit 160 can separately drive and sense the plurality of areas M1 to M10 of the touch panel 150. This group sensing by areas is referred to as multiplexing driving.

Referring to FIG. 13, according to the full-sensing system, the touch driving circuit 160 can sequentially sense the plurality of areas M1 to M10 of the touch panel 150.

For example, the touch driving circuit 160 can sequentially sense the plurality of areas M1 to M10 one by one. For example, the touch driving circuit 160 can sequentially sense the plurality of areas M1 to M10 two by two.

Referring to FIG. 13, according to the full-sensing system, the touch controller 170 senses three pen positions A, B, and C. This process can be a pen detecting process or can be a process of sensing a pen position of the pen 20 which has already been detected.

The touch controller 170 transmits pen position information POST' and POSI2 of three pen positions A, B, and C to the touch driving circuit 160 via the first and second interfaces IF1 and IF2 according to the fast transmission protocol.

Referring to FIG. 13, the touch driving circuit 160 receives the pen position information POSH and POSI2 from the touch controller 170 via the first and second interfaces IF1 and IF2 and senses only the areas M2, M4, and M7 corresponding to the three pen positions A, B, and C. In this way, the system of sensing only some areas M2, M4, and M7 without sensing all the areas M1 to M10 is referred to as a local-sensing system.

Referring to FIGS. 13 to 15, the touch display device 100 can operate in the full-sensing mode and operate in the local-sensing mode after a pen position has been recognized.

The full-sensing mode will be first described below.

Referring to FIGS. 13 to 15, for example, in a touch synchronization signal TSYNCN, a low-level section can be a touch driving period and a high-level section can be a display driving period.

Referring to FIGS. 13 to 15, in the touch driving period, the touch driving circuit 160 performs an internal operation based on a pulse width modulation signal PWM_TX in which a voltage level varies at a specific frequency.

Referring to FIGS. 14 and 15, in the touch driving period, the touch driving circuit 160 (also referred to herein as ROIC (Readout Integrated Circuit)) performs a reading operation of sequentially sensing the plurality of areas M1 to M10 two by two and transmitting the sensing data to the touch controller 170 every time using the master-slave operation between the touch controller 170 and the touch driving circuit 160.

In a first touch driving period, the touch driving circuit 160 performs multiplexing driving MUX 1, 2 for the first and second areas M1 and M2 which are driving multiplexing groups Driving MUX and transmits sensing data acquired as the result thereof as the read data to the touch controller 170. Here, the sensing data is sensing data for the first and second areas M1 and M2 which are sensing multiplexing groups Sensing MUX.

In a second touch driving period, the touch driving circuit 160 performs multiplexing driving MUX 3, 4 for the third and fourth areas M3 and M4 which are driving multiplexing groups Driving MUX and transmits sensing data acquired as the result thereof as the read data to the touch controller 170. Here, the sensing data is sensing data for the third and fourth areas M3 and M4 which are sensing multiplexing groups Sensing MUX.

In a third touch driving period, the touch driving circuit 160 performs multiplexing driving MUX 5, 6 for the fifth and sixth areas M5 and M6 which are driving multiplexing groups Driving MUX and transmits sensing data acquired as the result thereof as the read data to the touch controller 170. Here, the sensing data is sensing data for the fifth and sixth areas M5 and M6 which are sensing multiplexing groups Sensing MUX.

In a fourth touch driving period, the touch driving circuit 160 performs multiplexing driving MUX 7, 8 for the seventh and eighth areas M7 and M8 which are driving multiplexing groups Driving MUX and transmits sensing data acquired as the result thereof as the read data to the touch controller 170. Here, the sensing data is sensing data for the seventh and eighth areas M7 and M8 which are sensing multiplexing groups Sensing MUX.

In a fifth touch driving period, the touch driving circuit 160 performs multiplexing driving MUX 9, 10 for the ninth and tenth areas M9 and M10 which are driving multiplexing groups Driving MUX and transmits sensing data acquired as the result thereof as the read data to the touch controller 170. Here, the sensing data is sensing data for the ninth and tenth areas M9 and M10 which are sensing multiplexing groups Sensing MUX.

Referring to FIGS. 14 and 15, the touch controller 170 detects the pen positions form the sensing data acquired through the reading operation. The touch controller 170 performs a writing operation of transmitting write data including the detected pen position information POSI to the touch driving circuit 160. Accordingly, the full-sensing mode is switched to the local-sensing mode such that local sensing becomes possible.

Referring to FIGS. 14 and 15, it is assumed that a first pen 20 moves from the second area M2 to the first area M1 and the position of the first pen 20 changes from X1 to X2, X3, and X4. It is assumed that a second pen 20 moves from the fourth area M4 to the fifth area M5, moves to the fourth area M4 again, and then moves to the fifth area M5 again, and the position of the second pen 20 changes from Y1 to Y2, Y3, and Y4. It is assumed that a third pen 30 sequentially moves from the seventh area M7 to the eighth area M8, the ninth area M9, and the tenth area M10 and the position of the third pen 20 changes to Z1, Z2, Z3, and Z4.

Referring to FIG. 14, when the fast transmission protocol according to embodiments of the present disclosure is not used, the touch controller 170 has to transmit the pen position information POSI which is newly tracked from moment to moment via only one interface using the writing operation. Accordingly, the touch driving circuit 160 can take a long time for setting driving for local sensing and take a long time for tracking and updating the positions of the three pens 20.

Referring to FIG. 15, when the fast transmission protocol according to embodiments of the present disclosure is used, the first and second interfaces IF1 and IF2 allow bidirectional transmission and transmission via the first and second interfaces IF1 and IF2 can be simultaneously performed.

Referring to FIG. 15, when the reading operation is being performed, the touch controller 170 can transmit the first command signal CMDSIG1 and the second command signal CMDSIG2 including the pen position information POSI (POSI1 and POSI2) having a large amount of information to the touch driving circuit 160 via the first and second interfaces IF1 and IF2.

Accordingly, without performing a particular writing operation, the touch driving circuit 160 can fast set driving for local sensing on the basis of the pen position information POSI (POSI1 and POSI2) received through the reading operation and fast track and update the positions of the three pens 20.

Figure 16:
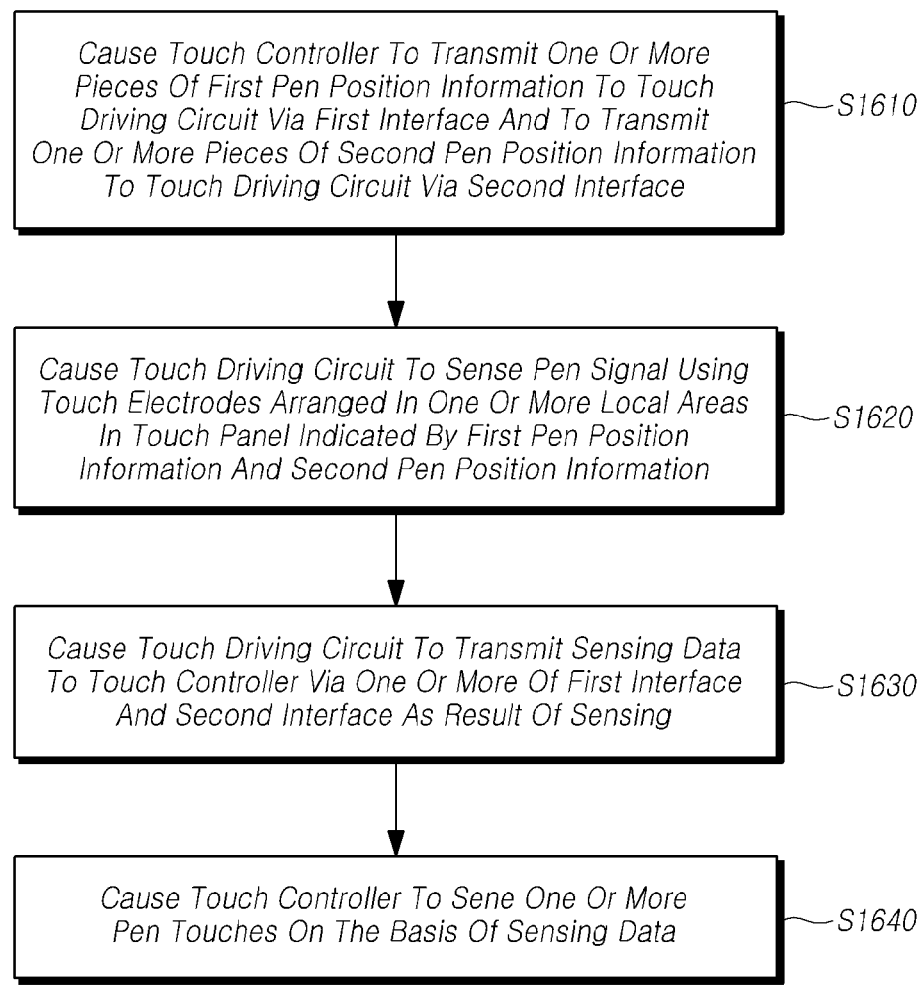
FIG. 16 is a flowchart illustrating a touch sensing method according to embodiments of the present disclosure.

FIG. 16 is a flowchart illustrating a touch sensing method according to embodiments of the present disclosure.

Referring to FIG. 16, a touch sensing method of the touch display device 100 including the touch controller 170 and the touch driving circuit 160 that perform the master-slave operation according to the embodiments of the present disclosure includes a step S1610 of causing the touch controller 170 to transmit one or more pieces of first pen position information POSH to the touch driving circuit 160 via the first interface IF1 and to transmit one or more pieces of second pen position information POSI2 other than the one or more pieces of first pen position information POSH to the touch driving circuit 160 via the second interface IF2, a step S1620 of causing the touch driving circuit 160 to sense a pen signal using touch electrodes TE which are arranged in one or more local areas in the touch panel 150 indicated by the one or more pieces of first pen position information POSH and the one or more pieces of second pen position information POSI2 received via the first interface IF1 and the second interface IF2, a step S1630 of causing the touch driving circuit 160 to transmit sensing data to the touch controller 170 via one or more of the first interface IF1 and the second interface IF2 as the result of sensing, and a step S1640 of causing the touch controller 170 to sense one or more pen touches on the basis of the sensing data received via the one or more of the first interface IF1 and the second interface IF2.

The touch display device 100 according to one or more embodiments of the present disclosure will be described below again in brief.

The touch display device 100 according to the embodiments of the present disclosure includes the touch panel 150 in which a plurality of touch electrodes TE are arranged, the touch controller 170 that outputs a first master signal (for example, a first command signal including command information and one or more pieces of first pen position information) to the first master pin MPIN1 corresponding to one end of the first interface IF1, outputs one or more second master signals (for example, a second command signal including one or more pieces of second pen position information) other than the first master signal to the second master pin MPIN2 corresponding to one end of the second interface IF2, receives first slave data (for example, first sensing data) from the first master pin MPIN1, and receives second slave data (for example, second sensing data) from the second master pin MPIN2, and the touch driving circuit 160 that receives the first master signal (for example, the first command signal including command information and one or more pieces of first pen position information) from the first slave pin SPIN' corresponding to the other end of the first interface IF1, receives the second master signal (for example, the second command signal including one or more pieces of second pen position information) from the second slave pin SPIN2 corresponding to the other end of the second interface IF2, and outputs the first slave data (for example, the first sensing data) to the first slave pin SPIN1 and outputs the second slave data (for example, the second sensing data) to the second slave pin SPIN2 in response to the first master signal and the second master signal.

According to the above embodiments of the present disclosure, it is possible to provide a touch display device 100 that includes an efficient communication interface COM-IF between a touch driving circuit 160 and a touch controller 170 which are elements for sensing a touch, a touch driving circuit 160, a touch controller 170, and a touch sensing method.

According to the embodiments of the present disclosure, it is possible to provide a fast transmission protocol using an efficient communication interface between a touch driving circuit 160 and a touch controller 170 and to provide a touch display device 100, a touch driving circuit 160, a touch controller 170, and a touch sensing method.

According to embodiments of the present disclosure, it is possible to provide a touch display device 100, a touch driving circuit 160, a touch controller 170, and a touch sensing method in which the touch controller 170 can fast transmit pen position information to the touch driving circuit 160 and the touch driving circuit 160 can fast perform local sensing and fast track a pen position.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
a touch panel in which a plurality of touch electrodes are arranged;
a touch controller configured to output one or more pieces of first pen position information to a first master pin corresponding to one end of a first interface, output one or more pieces of second pen position information different from the first pen position information to a second master pin corresponding to one end of a second interface, receive first sensing data from the first master pin, and receive second sensing data from the second master pin; and
a touch driving circuit configured to receive the one or more pieces of first pen position information from a first slave pin corresponding to another end of the first interface, receive the one or more pieces of second pen position information from a second slave pin corresponding to another end of the second interface, sense a pen signal from the touch electrodes which are arranged in one or more local areas in the touch panel indicated by the one or more pieces of first pen position information and the one or more pieces of second pen position information, output the first sensing data out of sensing data which is generated as a result of sensing to the first slave pin, and output the second sensing data out of the sensing data to the second slave pin.

2. The touch display device according to claim 1, wherein the touch controller is configured to output a first command signal including the one or more pieces of first pen position information along with command information to the first master pin, and output a second command signal including the one or more pieces of second pen position information to the second master pin while outputting the first command signal to the first master pin,
wherein the one or more pieces of first pen position information and the one or more pieces of second pen position information are pen position information on same pen or pen position information on different pens, and
wherein the touch driving circuit is configured to receive the first command signal including the one or more pieces of first pen position information from the first slave pin, and receive the second command signal including the one or more pieces of second pen position information from the second slave pin.

3. The touch display device according to claim 2, wherein the touch driving circuit is configured to change first pen position information which has been previously stored based on the one or more pieces of first pen position information included in the first command signal received from the first slave pin and change second pen position information which has been previous stored based on the one or more pieces of second pen position information included in the second command signal input from the second slave pin.

4. The touch display device according to claim 2, wherein the touch controller is configured to output a first address signal including address information to the first master pin, and
wherein the touch driving circuit is configured to receive the first address signal including the address information from the first slave pin.

5. The touch display device according to claim 4, wherein the touch controller is configured to output a slave selection signal to a third master pin corresponding to one end of a third interface,
wherein the touch driving circuit is configured to receive the slave selection signal from a third slave pin corresponding to the other end of the third interface, and
wherein the slave selection signal has a first signal level and a second signal level which are different from each other and a period in which the slave selection signal has the second signal level includes a first period, a second period, and a third period.

6. The touch display device according to claim 5, wherein the first address signal is transmitted from the touch controller to the touch driving circuit via the first interface in the first period,
wherein, in the second period, the one or more pieces of first pen position information included in the first command signal are transmitted from the touch controller to the touch driving circuit via the first interface and the one or more pieces of second pen position information are transmitted from the touch controller to the touch driving circuit via the second interface, and
wherein, in the third period, the first sensing data is transmitted from the touch driving circuit to the touch controller via the first interface, and the second sensing data different from the first sensing data is transmitted from the touch driving circuit to the touch controller via the second interface.

7. The touch display device according to claim 6, wherein the touch controller is configured to output a first clock signal, a second clock signal, and a third clock signal to a fourth master pin corresponding to one end of a fourth interface,
wherein the touch driving circuit is configured to receive the first clock signal, the second clock signal, and the third clock signal from a fourth slave pin corresponding to another end of the fourth interface,
wherein a period in which the first clock signal is transmitted from the touch controller to the touch driving circuit via the fourth interface includes the first period,
wherein a period in which the second clock signal is transmitted from the touch controller to the touch driving circuit via the fourth interface includes the second period, and
wherein a period in which the third clock signal is transmitted from the touch controller to the touch driving circuit via the fourth interface includes the third period.

8. The touch display device according to claim 4, wherein the touch controller is configured to output a second address signal including control information to the second master pin while outputting the first address signal to the first master pin,
wherein the touch driving circuit is configured to receive the second address signal including the control information from the second slave pin while receiving the first address signal from the first slave pin, and
wherein the control information includes one or more of address information different from the address information of the first address signal, driving control information, and pen number information.

9. The touch display device according to claim 8, wherein the touch driving circuit is configured to transmit an interrupt request to the touch controller via an additional interface different from the first interface and the second interface.

10. The touch display device according to claim 1, wherein the touch driving circuit is configured to transmit an interrupt request to the touch controller via the second interface.

11. The touch display device according to claim 1, wherein the touch driving circuit is configured to sense a first symbol section of a pen signal which is supplied to one or more touch electrodes in the touch panel in a first sensing time,
wherein the touch driving circuit is configured to convert an analog sensing value based on a result of sensing in the first sensing time into a digital sensing value to generate sensing data in a first conversion time,
wherein the touch driving circuit is configured to divide the sensing data generated in the first conversion time into the first sensing data and the second sensing data and transmit the divided first and second sensing data to the touch controller via the first interface and the second interface, respectively, in a first transmission time, and
wherein the first conversion time is equal to or shorter than the first sensing time and the first transmission time is equal to or shorter than the first conversion time.

12. The touch display device according to claim 11, wherein the touch driving circuit is configured to sense a second symbol section of a pen signal which is supplied to one or more touch electrodes in the touch panel in a second sensing time,
wherein the touch driving circuit is configured to convert an analog sensing value based on a result of sensing in the second sensing time into a digital sensing value to generate the sensing data in a second conversion time,
wherein the touch driving circuit is configured to divide the sensing data generated in the second conversion time into the first sensing data and the second sensing data and transmit the divided first and second sensing data to the touch controller via the first interface and the second interface, respectively, in a second transmission time,
wherein the second sensing time overlaps the first conversion time and the second conversion time overlaps the first transmission time, and
wherein the first conversion time is equal to or shorter than the second sensing time and the first transmission time is equal to or shorter than the second conversion time.

13. A touch display device comprising:
a touch panel in which a plurality of touch electrodes are arranged;
a touch controller configured to output a first master signal to a first master pin corresponding to one end of a first interface, output one or more second master signals other than the first master signal to a second master pin corresponding to one end of a second interface, receive first slave data from the first master pin, and receive second slave data from the second master pin; and
a touch driving circuit configured to receive the first master signal from a first slave pin corresponding to another end of the first interface, receive the second master signal from a second slave pin corresponding to another end of the second interface, and output the first slave data to the first slave pin and output the second slave data to the second slave pin in response to the first master signal and the second master signal.

14. A touch controller configured to perform a master-slave operation with a touch driving circuit, the touch controller comprising:
a first master pin that corresponds to a first interface;
a second master pin that corresponds to a second interface; and
a master input/output circuit configured to output first pen position information to the touch driving circuit via the first master pin, output second pen position information different from the first pen position information to the touch driving circuit via the second master pin, and receive first sensing data out of sensing data, which is generated as a result of sensing a pen signal using touch electrodes arranged in one or more local areas in a touch panel which are indicated by the first pen position information and the second pen position information by the touch driving circuit, from the touch driving circuit via the first master pin.

15. The touch controller according to claim 14, wherein the master input/output circuit is configured to receive second sensing data other than the first sensing data out of the sensing data from the touch driving circuit via the second master pin while receiving the first sensing data from the touch driving circuit via the first master pin.

16. The touch controller according to claim 14, further comprising:
a third master pin that corresponds to a third interface; and
a fourth master pin that corresponds to a fourth interface,
wherein the master input/output circuit is configured to output a slave selection signal to the touch driving circuit via the third master pin and output a clock signal to the touch driving circuit via the fourth master pin.

17. A touch driving circuit, comprising:
a first slave pin that corresponds to a second end out of a first end and the second end of a first interface;
a second slave pin that corresponds to a second end out of a first end and the second end of a second interface; and
a slave input/output circuit configured to receive first pen position information from a touch controller via the first slave pin, receive second pen position information different from the first pen position information from the touch controller via the second slave pin, sense a pen signal using touch electrodes which are arranged in one or more local areas in a touch panel indicated by the first pen position information and the second pen position information, and output first sensing data out of sensing data generated as a result of sensing to the touch controller via the first slave pin.

18. The touch driving circuit according to claim 17, wherein the slave input/output circuit is configured to output second sensing data different from the first sensing data out of the sensing data to the touch controller via the second slave pin while outputting the first sensing data to the touch controller via the first slave pin.

19. The touch driving circuit according to claim 17, further comprising:
a third slave pin that corresponds to a third interface; and
a fourth slave pin that corresponds to a fourth interface,
wherein the slave input/output circuit is configured to receive a salve selection signal from the touch controller via the third slave pin and receive a clock signal from the touch controller via the fourth slave pin.

20. A touch sensing method usable in a touch display device including a touch controller and a touch driving circuit that perform a master-slave operation, the touch sensing method comprising:
causing the touch controller to transmit one or more pieces of first pen position information to the touch driving circuit via a first interface and to transmit one or more pieces of second pen position information other than the one or more pieces of first pen position information to the touch driving circuit via a second interface;
causing the touch driving circuit to sense a pen signal using touch electrodes which are arranged in one or more local areas in a touch panel indicated by the one or more pieces of first pen position information and the one or more pieces of second pen position information received via the first interface and the second interface;
causing the touch driving circuit to transmit sensing data to the touch controller via one or more of the first interface and the second interface as a result of sensing; and
causing the touch controller to sense one or more pen touches based on the sensing data received via the one or more of the first interface and the second interface.

* * * * *